United States Patent [19]
Takeda et al.

[11] Patent Number: 5,805,601
[45] Date of Patent: Sep. 8, 1998

[54] SYSTEM FOR CONTROLLING SIGNAL TRANSFER BETWEEN A PLURALITY OF DEVICES

[75] Inventors: Shinichi Takeda; Hiroya Egoshi; Yoshinobu Matsukawa, all of Kawasaki, Japan

[73] Assignee: Fujitsu Limited, Kanagawa, Japan

[21] Appl. No.: 624,790

[22] Filed: Mar. 27, 1996

[30] Foreign Application Priority Data

Mar. 27, 1995 [JP] Japan ..................................... 7-067385

[51] Int. Cl.⁶ ........................................................ H04J 3/06
[52] U.S. Cl. ........................................... 370/505; 370/535
[58] Field of Search ..................................... 370/505, 535

[56] References Cited

U.S. PATENT DOCUMENTS

| | | | |
|---|---|---|---|
| 3,995,119 | 11/1976 | Pachynski, Jr. ........................ | 370/505 |
| 4,649,536 | 3/1987 | Krinock ................................. | 370/505 |
| 5,504,745 | 4/1996 | Petz et al. .............................. | 370/535 |

*Primary Examiner*—Melvin Marcelo
*Attorney, Agent, or Firm*—Helfgott & Karas, P.C.

[57] ABSTRACT

A system for controlling signal transfer between a plurality of devices, for controlling the transfer of signals between a main device having processors packaged therein and a subsidiary device having units packaged therein, includes a multiplexer section on the main device side for multiplexing signals from a control system processor and a monitor system processor of the main device; a demultiplexer section on a subsidiary side for demultiplexing the multiplex signal from the multiplexer section on the main device side and distributing it to the units of the subsidiary device; a multiplexer section on the subsidiary device side for multiplexing the signals from the units of the subsidiary device; and a demultiplexer section on the main device side for demultiplexing the multiplex signal from the multiplexer section on the subsidiary device side and distributing it to the control system processor and the monitor system processor. The multiplexer section on the main device side executes bit-stuffing and multiplexing in such a manner as to correspond to the phase or frequency difference between clock signals from clock generators and transfers the signal to the subsidiary device through a cable.

6 Claims, 20 Drawing Sheets

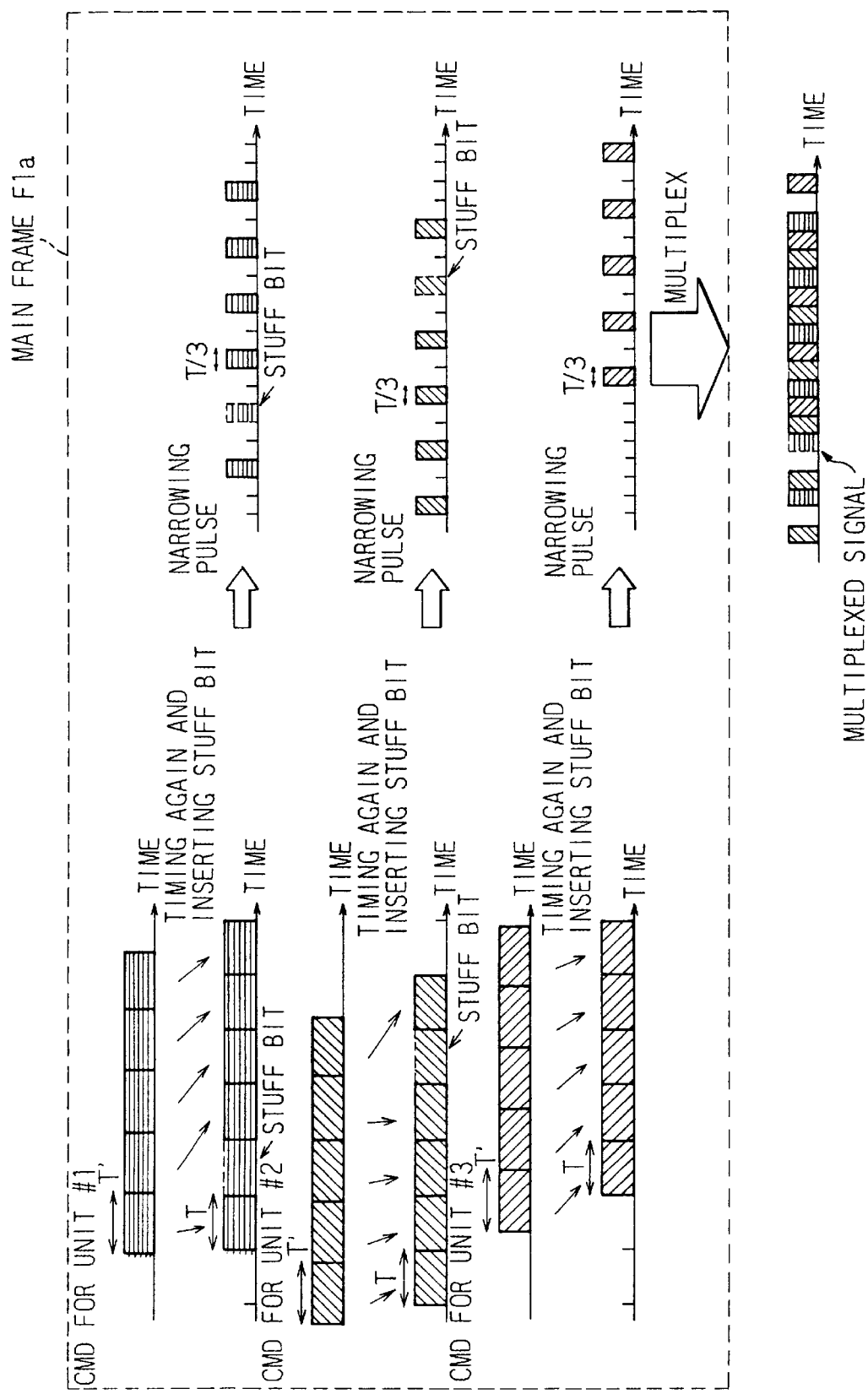

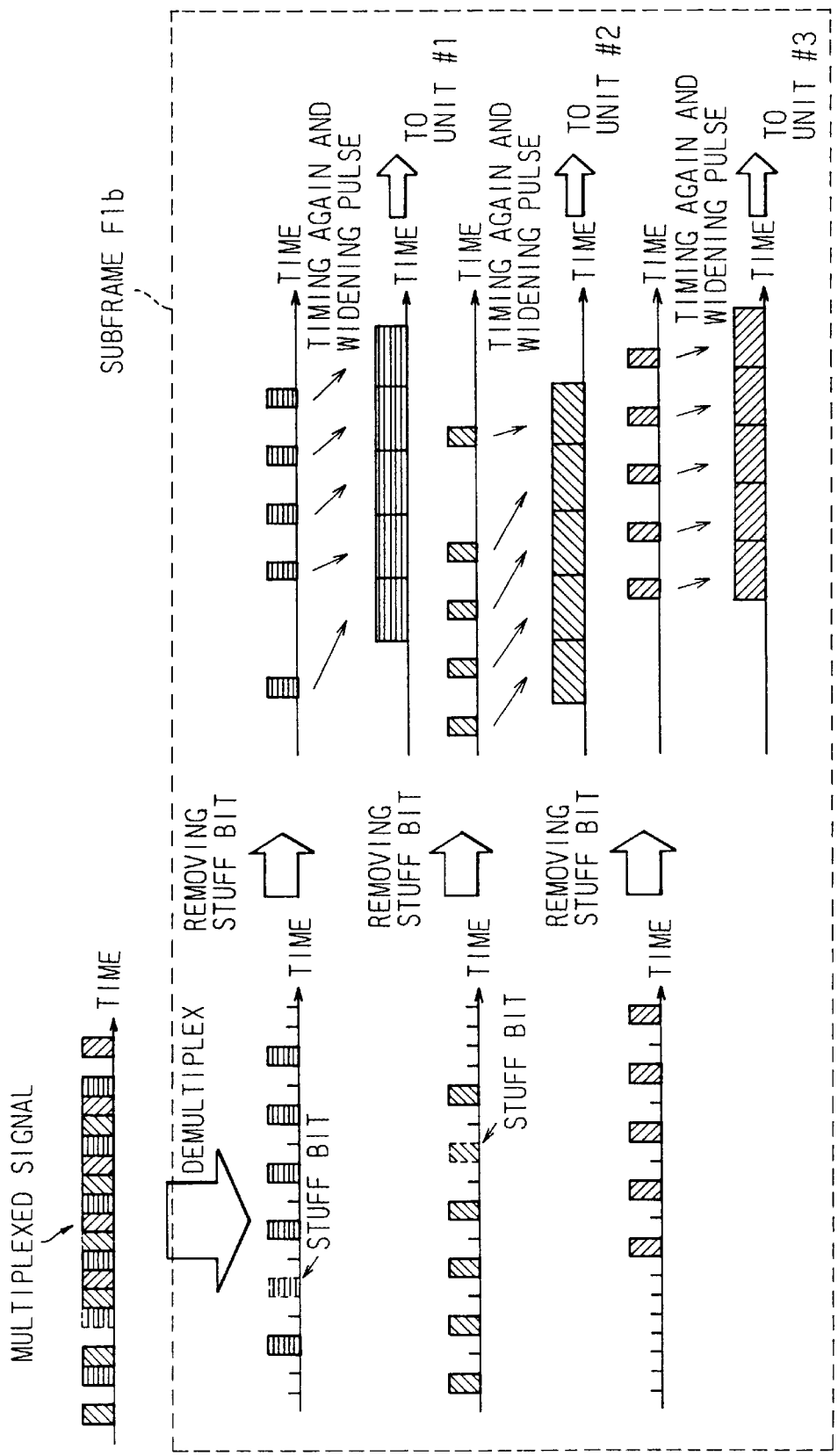

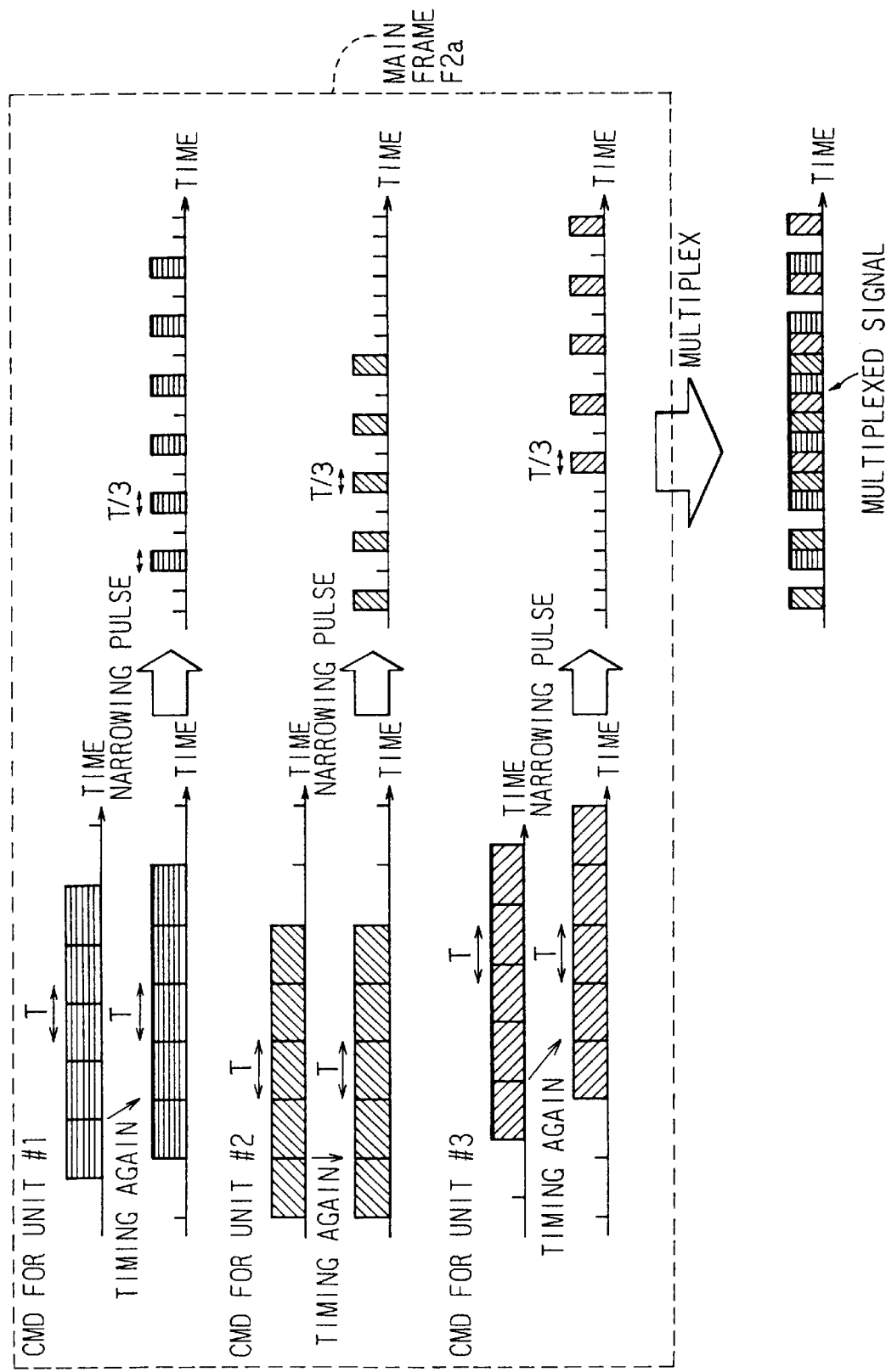

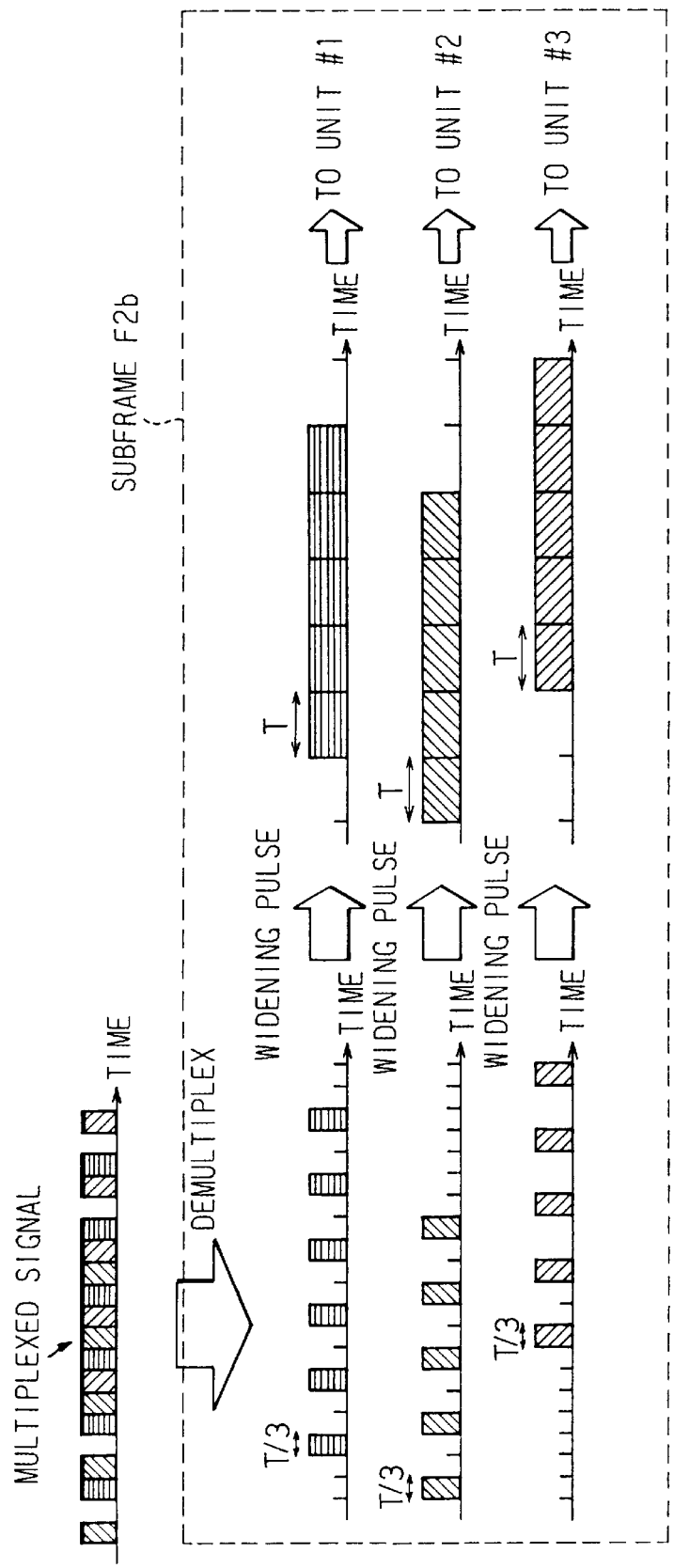

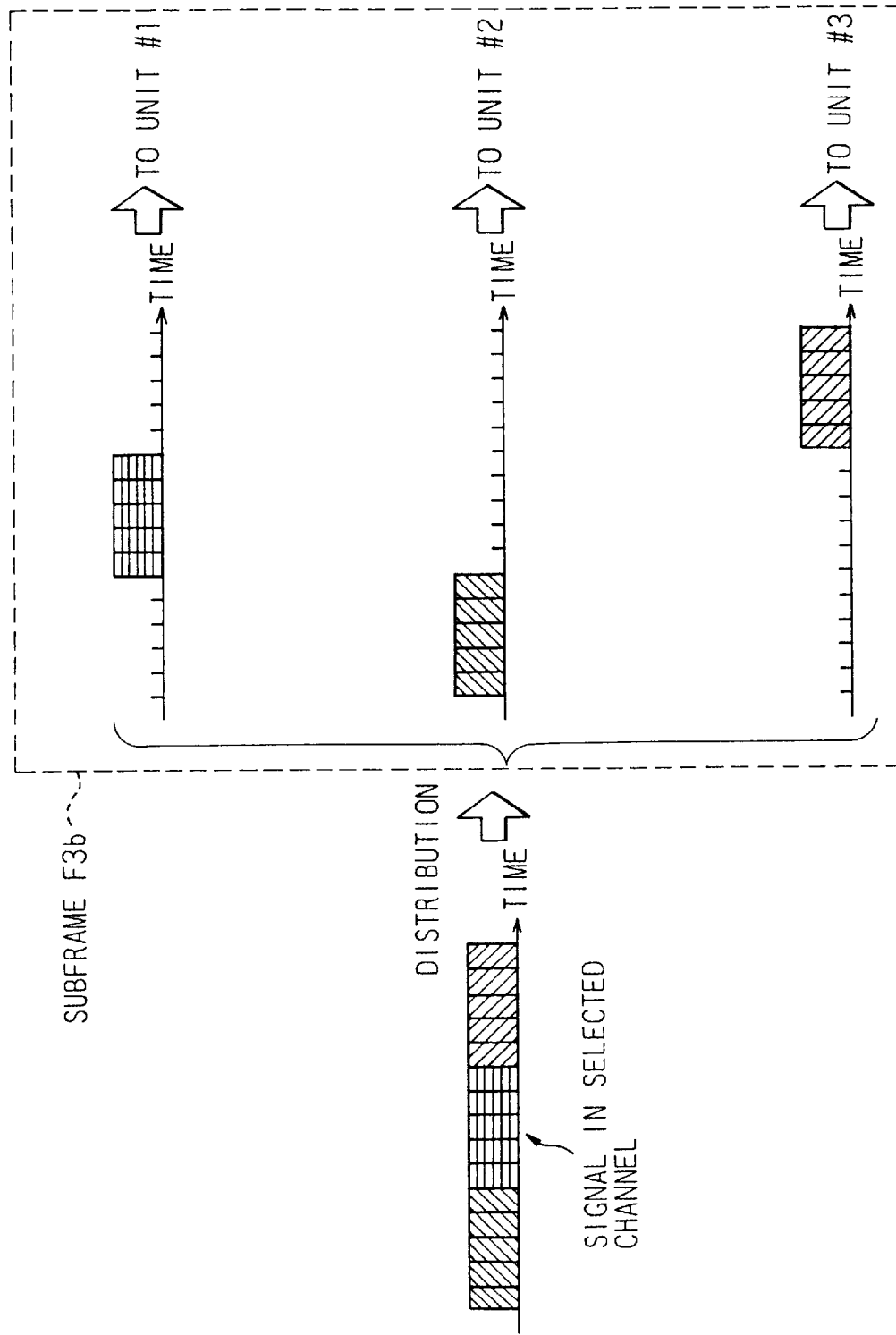

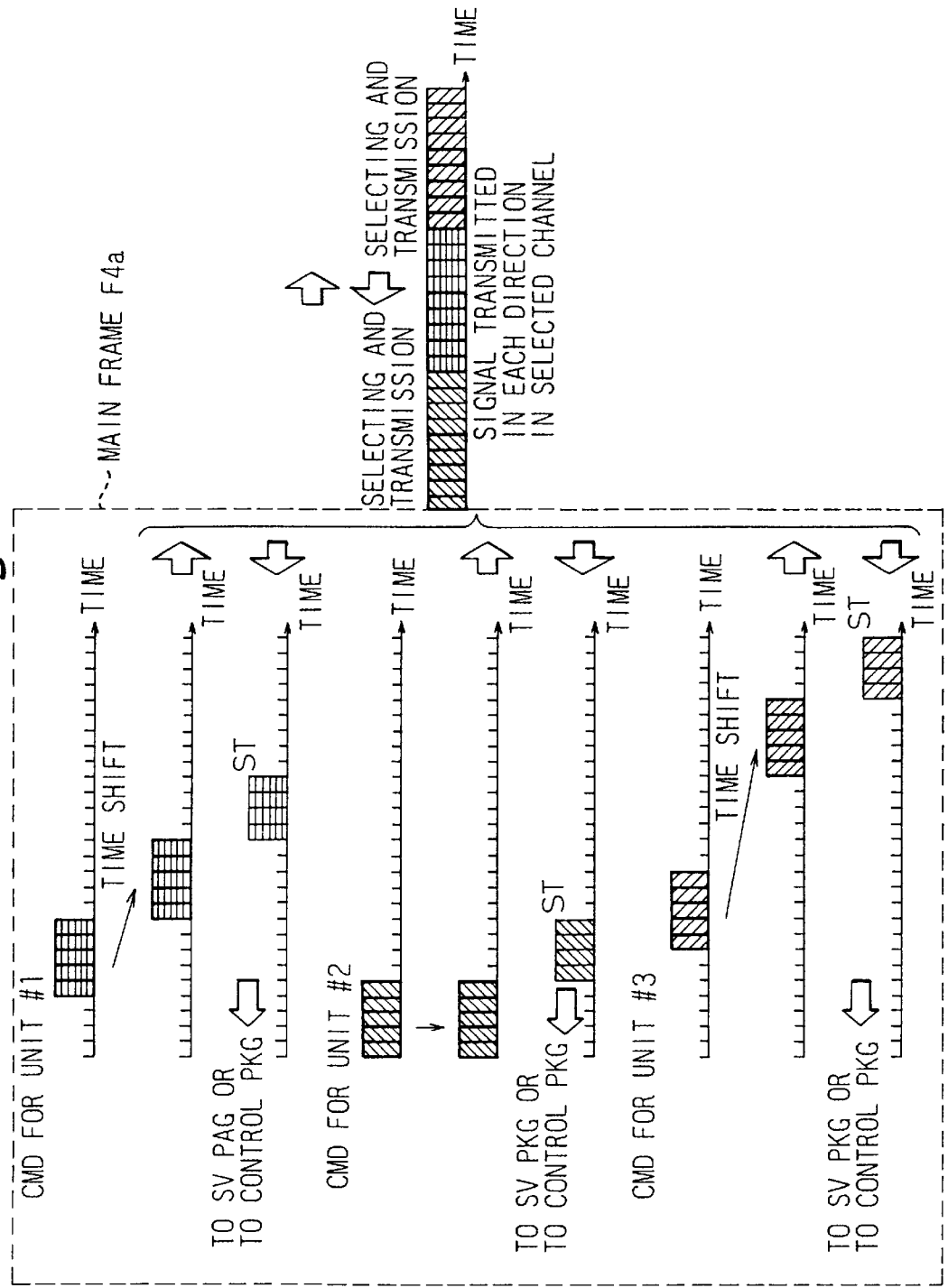

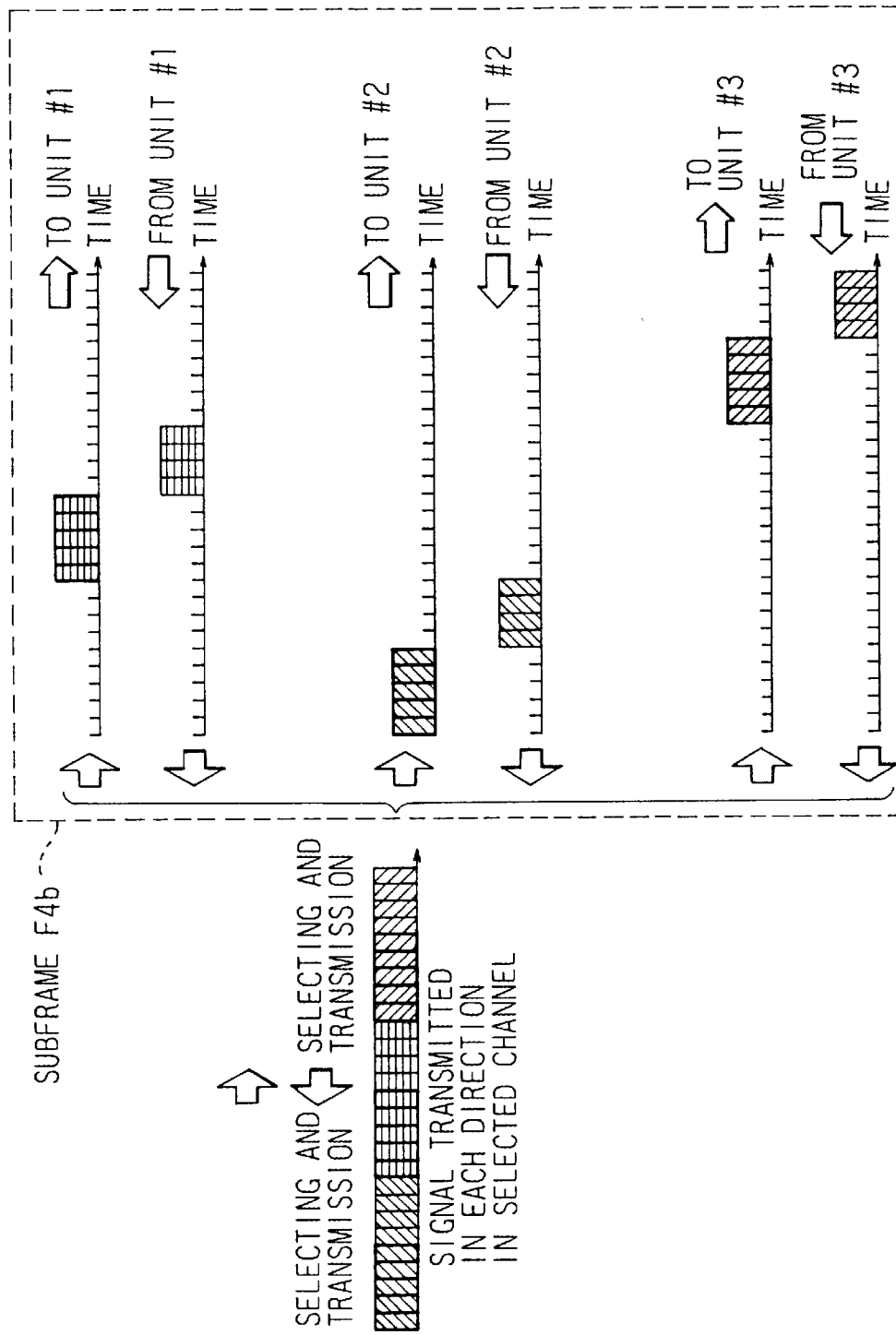

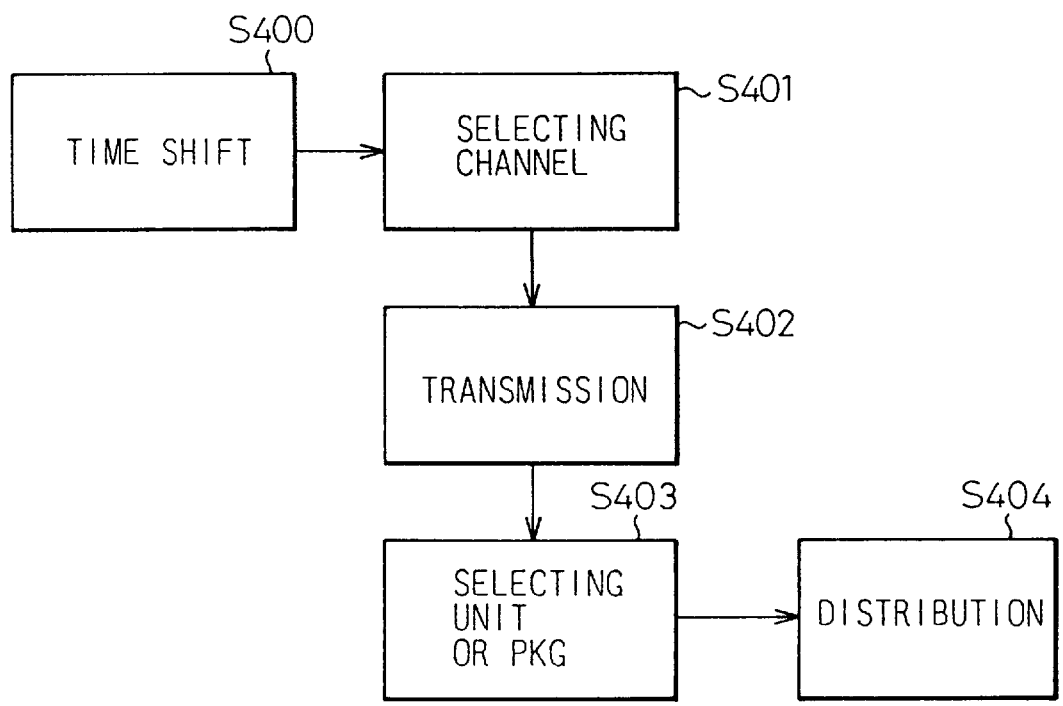

SYSTEM FOR CONTROLLING SIGNAL TRANSFER BETWEEN A PLURALITY OF DEVICES

BACKGROUND OF THE INVENTION

1. Field of the Invention

This invention relates to a system for controlling signal transfer between a plurality of devices and for controlling the transfer of signals containing various data between a main device and a subsidiary device in a device structure including a plurality of devices such as a data transfer apparatus.

The data volumes processed by the data transfer apparatus, etc., have been increasing drastically in recent years, and it has become practically difficult to process signals containing these data using a single device structure. In other words, since the data transfer apparatus for transferring large amounts of data can no longer transfer such large amounts of data by a single device structure, the data transfer apparatus employs the structure comprising a plurality of devices and transfers a variety of data by connecting the devices by cables. Therefore, the signal transfer structure between the devices must be further simplified.

2. Description of the Related Art

The construction of a system for controlling signal transfer between a plurality of devices according to the prior art will be hereby explained with reference to FIGS. 1 to 3 of the accompanying drawings in order to clarify the problems encountered in signal transfer control between a plurality of devices in the prior art.

FIG. 1 is an explanatory view showing a single device structure according to the prior art. In the drawing, reference numeral 60 denotes a device, reference numeral 61 denotes a control system processor (that is, Central Processing Unit; CPU), reference numeral 62 denotes a monitor system processor (that is, CPU), reference numerals 63 and 64 denote clock generators, and reference numeral 65 denotes a plurality of units (UNIT #1 to UNIT #n). The control system processor 61, the monitor system processor 62 and a plurality of units 65 are packaged (i.e., assembled) in a single device, forming thereby a transfer apparatus, for example. When inserted into the packaging position of the device 60, each unit 65 is connected to the control system processor 61 and the monitor system processor 62 through wiring of a backboard.

During the operation as a transfer apparatus, the command signals CMD are transmitted from the control system processor 61 and the monitor system processor 62 to each unit 65, and status signals ST corresponding to the command signals are delivered from each unit 65 to the control system processor 61 or the monitor system processor 62. In this way, each unit is controlled and monitored variously by the control system processor 61 and the monitor system processor 62.

FIG. 2 is an explanatory view of the first example of a structure including a plurality of devices according to the prior art. Reference numeral 70a denotes a main device, reference numeral 70b denotes a subsidiary device, reference numerals 71a and 71b denote control system processors, reference numerals 72a and 72b denote monitor system processors, reference numerals 73a, 73b, 74a and 74b denote clock generators and reference numerals 75a and 75b denote a plurality of units (that is, UNIT #1' to UNIT #n' and UNIT #1 to UNIT #n). Symbol CMD denotes a command signal and ST does a status signal.

When the data processing amounts of the transfer apparatus become relatively large, a structure using a plurality of devices is employed because a single device structure cannot cope with such data processing amounts. In this case, the main device 70a and the subsidiary device 70b having the same structure are disposed as shown in the drawing. A plurality of units 75a are controlled and monitored inside the main device 70a by the control system processor 71a and the monitor system processor 72a. A plurality of units 75b are likewise controlled and monitored inside the subsidiary device 70b by the control system processor 71b and the monitor system processor 72b. The control processor 71a of the main device 70a is connected to the control system processor 71b of the subsidiary device 70a, and the monitor system processor 72a of the main device 70a is connected to the monitor system processor 72b of the subsidiary device 70b so that communication can be made between them and the apparatus can be controlled and managed as a whole.

FIG. 3 is an explanatory view of the second example of the structure including a plurality of devices according to the prior art. In the structure shown in FIG. 2, the control system processor and the monitor system processor are provided to each of the devices, and the system becomes therefore complicated and expensive as a whole. Accordingly, the main device 80a having the control system processor (CPU) 81 and the monitor system processor 82 (CPU) packaged therein is connected to the subsidiary device 80b having a plurality of units 84 (UNIT #1 to UNIT #n) packaged therein by the cables 83 so that the control system processor 81 and the monitor system processor 82 of the main device 80a can control and monitor the units (not shown) packaged in the main device 80a as well as the units 84 packaged in the subsidiary device 80b.

In the prior art example shown in FIG. 2, the control system processors 71a and 71b and the monitor system processors 72a and 72b are mounted to the main device 70a and to the subsidiary device 70b, respectively, so as to control and monitor the units 75a and 75b. Therefore the connection structure between the devices is relatively simple. Nonetheless, this prior art example involves a problem in that the construction of each device is complicated and expensive.

In contrast, the prior art example shown in FIG. 3 controls and monitors the units 84 of the subsidiary device 80b by the control system processor 81 and the monitor system processor 82 mounted to the main device 80a, and its construction is more economical than that of FIG. 2. However, the main device 80a and the subsidiary device 82 must be connected to each other by the cables 83 and in this case, the number of the cables 83 for connecting the control system processor 81 and the monitor system processor 82 to the units 85 of the subsidiary device 80b increases in accordance with the number of units to be mounted to the subsidiary device 80b, so that the connecting operation becomes complicated and the problem of a connection error occurs.

SUMMARY OF THE INVENTION

In view of the above-described problems, the main object of the present invention is to provide a system for controlling signal transfer between a plurality of devices, which can prevent a connection error, etc., by simplifying the connection structure between the main device and the subsidiary device.

To accomplish the object described above, the system for controlling signal transfer between a plurality of devices according to the present invention, for controlling the signal transfer between a main device having at least a control system processor and a monitor system processor packaged thereto and a subsidiary device having a plurality of units packaged therein (i.e., a plurality of units assembled therein), includes a multiplexer section on the main device side for multiplexing the signals from the control system processor and the monitor system processor of the main device; a demultiplexer section on the subsidiary device side for demultiplexing (i.e., separating) a multiplex signal from the multiplexer section on the main device side and distributing it to the units of the subsidiary device; a multiplexer section on the subsidiary device side for multiplexing the signal from the units of the subsidiary device; and a demultiplexer section on the main device side for demultiplexing the multiplex signal from the multiplexer section on the subsidiary device side and distributing it to the control system processor and the monitor system processor of the main device.

Here, the multiplexer section on the main device side is equipped with a clock generator for multiplexing and executes bit-stuffing and multiplexing in such a manner as to correspond to the difference between the phase of the clock signal from this clock generator and the phases of the clock signals from clock generators of the control system processor and the monitor system processor. In other words, the multiplexer section executes bit-stuffing and multiplexing so as to correct the above difference.

On the other hand, the demultiplexer section on the subsidiary device side is equipped with a phase sync oscillator for generating a clock signal in phase synchronism with the multiplex signal from the multiplexer section on the main device side, executes demultiplexing of the multiplex signal, which is subjected to bit-stuffing and multiplexing, from the multiplexer section on the main device side, in bit-stuffing synchronism, and distributes it to the units.

When the signal transfer is controlled between the main device having at least the control system processor and the monitor system processor packaged therein and the subsidiary device having a plurality of units packaged therein, the system for controlling the signal transfer between a plurality of devices according to the present invention preferably includes the multiplexer section on the main device side for multiplexing the signals from the control system processor and the monitor system processor of the main device; the demultiplexer section on the subsidiary device side for demultiplexing the multiplex signal from the multiplexer section on the main device side and distributing it to the units of the subsidiary device; the multiplexer section on the subsidiary device side for multiplexing the signals from the units of the subsidiary device; and the demultiplexer section on the main device side for demultiplexing the multiplex signal from the multiplexer section on the subsidiary device side and distributing it to the control system processor and the monitor system processor of the main device. Here, the multiplexer section on the main device side is equipped with a clock generator for multiplexing, the clock signal from this clock generator is supplied to the control system processor, the monitor system processor and the demultiplexer section on the main device side, and is supplied also to the multiplexer section on the subsidiary device side and the demultiplexer section on the subsidiary device side.

Further, the system described above multiplexes the signals from the control system processor and the monitor system processor to the units of the subsidiary devices on the basis of the clock signal described above and transfers it to the subsidiary device, and the demultiplexer section on the subsidiary device side demultiplexes the multiplex signal from the multiplexer section on the main device side and distributes it to the units.

When the signal transfer is controlled between the main device having packaged therein at least the control system processor and the monitor system processor each having a clock generator and the subsidiary device having a plurality of units packaged therein, the system for controlling the signal transfer between a plurality of devices according to the present invention further preferable includes the multiplexer section on the main device side, equipped with a clock generator, for multiplexing the signals from the control system processor and the monitor system processor of the main device on the basis of a clock signal from this clock generator; the demultiplexer section on the subsidiary device side for demultiplexing the multiplex signal from the multiplexer section on the main device side and distributing it to the units of the subsidiary device; the multiplexer section on the subsidiary device side for multiplexing the signals from the units of the subsidiary device; and the demultiplexer section on the main device side for demultiplexing the multiplex signal from the multiplexer section on the subsidiary device side and distributing it to the control system processor and the monitor system processor of the main device.

Here, each of the control system processor and the monitor system processor of the main device is equipped with a switch section in which switching operations are carried out, so that the control system processor and the monitor system processor of the main device are operated in synchronism the clock signal from the clock generator of the multiplexer section on the main device side when the subsidiary device is connected, and are operated in synchronism with the clock signal of the clock generator of each of these processors when the subsidiary device is cut off. When the subsidiary device is connected, the multiplexer section on the main device side supplies the clock signal from this multiplexer section on the main device side to the control system processor and the monitor system processor through the switch section, supplies it also to the multiplexer section on the subsidiary side as well as to the demultiplexer section on the main and subsidiary device side, multiplexes the signals from the control system processor and the monitor system processor to the units on the basis of this clock signal, and transfers it to the subsidiary device, and the demultiplexer section on the subsidiary device side demultiplexes the multiplex signal from the multiplexer section on the main device side and distributes it to the units.

When the signal transfer is controlled between the main device having at least the control system processor and the monitor system processor packaged therein and the subsidiary device having a plurality of units packaged therein, the system for controlling the signal transfer between a plurality of devices according to the present invention includes selectors on the main device side for sending the signals from the control system processor and the monitor system processor of the main device and selectors on the subsidiary device side for distributing the signals from the selectors on the main device side, and controls the selectors on both the main device side and the subsidiary device side in such a manner as to select the units of the subsidiary device for transferring the signals from the main device and the units of the subsidiary device for transferring the signals to the main device.

Further preferably, the selectors on both the main device side and the subsidiary device side in the system for controlling the signal transfer between a plurality of devices according to the present invention can be disposed in such a manner as to correspond to the kinds of signals between the control system processor and the units of the subsidiary device and between the monitor system processor and the units of the subsidiary device.

Further preferably, the selectors on both the main device side and the subsidiary device side in the system for controlling the signal transfer between a plurality of devices according to the present invention can be disposed in such a manner as to correspond to the control system processor and the monitor system controller.

Further preferably, each of the control system processor and the monitor system processor in the system for controlling the signal transfer between a plurality of devices according to the present invention is equipped with a clock generator, the selector on the main device side is equipped with a clock generator, and each of the control system processor and the monitor system processor of the main device is further equipped with a switch section in which switching operations are carried out, so that the control system processor and the monitor system processor are operated in synchronism with the clock signal from the clock generator of the selector on the main device side when the subsidiary device is connected, and are operated in synchronism with the clock signal from the clock generator of each of these processors when the subsidiary device is cut off.

First, in the system for controlling the signal transfer between a plurality of devices according to the present invention, each of the control system processor and the monitor system processor is equipped with a clock generator, the multiplexer section on the main device side is equipped with a clock generator for multiplexing, and when the command signals from the control system processor and the monitor system processor are multiplexed in the multiplexer section on the main device side, bit-stuffing and multiplexing is executed by inserting and removing a stuff bit (i.e., a stuff pulse) on the basis of the clock signal from the clock generator of the multiplexer section on the main device side, and the signal is transferred to the subsidiary device through one cable. The demultiplexer section on the subsidiary side executes demultiplexing of the signal by removing the stuff bit in phase synchronism with the multiplex signal in such a manner as to correspond to the units, and distributes the signal. The status signal from each unit is multiplexed by the multiplexer section on the subsidiary device side on the basis of the clock signal from the clock generator, and is transferred to the main device through one cable. The demultiplexer section on the main device side executes demultiplexing on the basis of the clock signal from the phase sync oscillator keeping phase synchronism with the multiplex signal, and transfers the status signal corresponding to each unit to the control system processor and the monitor system processor.

Second, in the system for controlling the signal transfer between a plurality of devices according to the present invention, the clock signal from the clock generator of the multiplexer section on the main device side is supplied to the control system processor and the monitor system processor, and the main device is operated by the same clock signal. Accordingly, the multiplexer section on the main device side multiplexes the command signals from the control system processor and the monitor system processor by the simple multiplexing process, and transfers the multiplex signal to the subsidiary device. The demultiplexer section on the subsidiary side demultiplexes the multiplex signal on the basis of the clock signal from the main device and distributes the signal to each unit. In the same way as described above, the status signal from each unit of the subsidiary device is multiplexed by the multiplexer section on the subsidiary device side, is transferred to the main device, is demultiplexed by the demultiplexer section on the main device side, and is thereafter transferred to the control system processor and the monitor system processor.

Third, in the system for controlling the signal transfer between a plurality of devices, each of the control system processor, the monitor system processor and the multiplexer section on the main device side is equipped with the clock generator, and the clock signal from the clock generator of the multiplexer section on the main device side is supplied to each section when the multiplexer section on the main device side and the demultiplexer section on the main device side are packaged in the main device and are connected to the subsidiary device, and execute multiplexing and demultiplexing on the basis of this clock signal, respectively. When the subsidiary device is cut off and only the main device is operated, the multiplexer section on the main device side and the demultiplexer section on the main device side are brought into the unpackaged state. Therefore, the control system processor and the monitor system processor operate by the clock signals from the respective clock generators. In other words, the supply route of the clock signals is switched by the switch section when the subsidiary device is connected and when it is not connected.

Fourth, in the system for controlling the signal transfer between a plurality of devices according to the present invention, the selector on the main device side and the selector on the subsidiary device side are synchronized. Therefore, when the selector on the main device side selects the command signal from the control system processor to the unit of the subsidiary device and transfers it to the subsidiary device, for example, the selector on the subsidiary side selects and transfers this command signal to the unit. When the selector on the subsidiary device side selects the status signal from the unit of the subsidiary device to the control system processor and transfers it to the main device, for example, the selector on the main device side selects this status signal and transfers it to the control system processor.

Fifth, in the system for controlling the signal transfer between a plurality of devices according to the present invention, the selector on the main device side and the selector on the subsidiary device side are disposed for each kind of the signal between the main device and the subsidiary device. In this case, even when the number of kinds of signals increases, the signal transfer can be made for each kind of signals without increasing the transfer rate between the main device and subsidiary device.

Sixth, in the system for controlling the signal transfer between a plurality of devices according to the present invention, the control system processor and the monitor system processor receive the status signal after sending the command signal to the unit, for example, and do not simultaneously execute transfer of the command signal and reception of the status signal. Therefore, the command signal and the status signal can be transferred between the main device and the subsidiary device by disposing the selector on the main device side and the selector on the subsidiary device side, i.e., a pair of selectors, corresponding to the control system processor and another pair of selectors corresponding to the monitor system processor.

Seventh, in the system for controlling the signal transfer between a plurality of devices according to the present invention, the clock signal from the clock generator of the selector on the main device side is supplied to the control system processor and the monitor system controller when the subsidiary device is disposed, so as to execute the transfer and reception processing of the command signal and the status signal, respectively, and when the subsidiary device is not connected, the control system processor and the monitor system processor are operated in synchronism with the clock signals from their respective clock generators. In other words, the clock signals are switched by the switch section.

BRIEF DESCRIPTION OF THE DRAWINGS

The above object and features of the present invention will be more apparent from the following description of the preferred embodiments with reference to the accompanying drawings, wherein:

FIGS. 5A and 5B are flowcharts, each useful for explaining the flow of signals by a bit-stuffing and multiplexing system used in the first preferred embodiment of the present invention;

FIGS. 9A and 9B are timing charts, each useful for explaining the flow of signals in a synchronous multiplexing system used for the second and third preferred embodiments of the present invention;

FIGS. 12A and 12B are timing charts, each useful for explaining the flow of signals by utilizing a selector portion of the fourth preferred embodiment of the present invention;

FIGS. 15A and 15B are flowcharts, each useful for explaining the flow of signals by utilizing a selector of the fifth preferred embodiment of the present invention; and FIG. 16 is a flowchart useful for explaining the procedure of signal processing in the fifth preferred embodiment of the present invention.

DESCRIPTION OF THE PREFERRED EMBODIMENTS

Hereinafter, the description of some preferred embodiments according to the present invention will be given with reference to the accompanying drawings, FIGS. 4 through 16.

Figure 1:
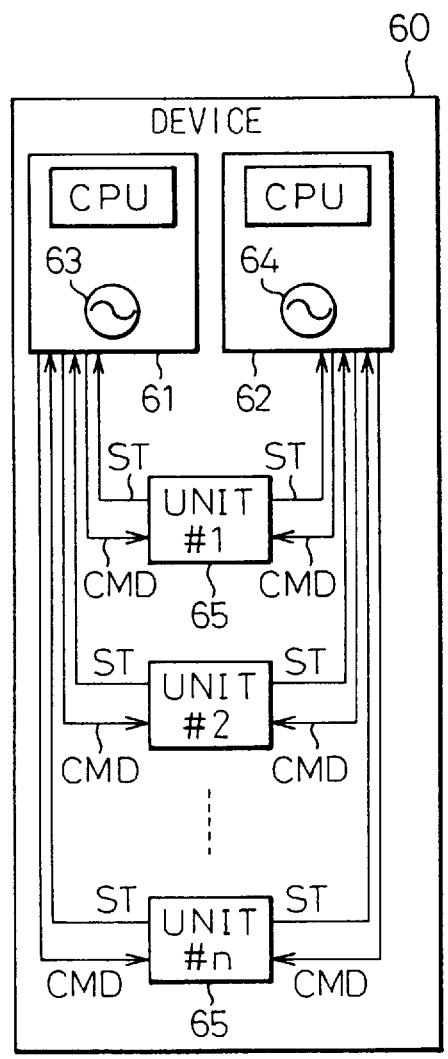
FIG. 1 is an explanatory view of a single device structure according to the prior art.
Figure 2:
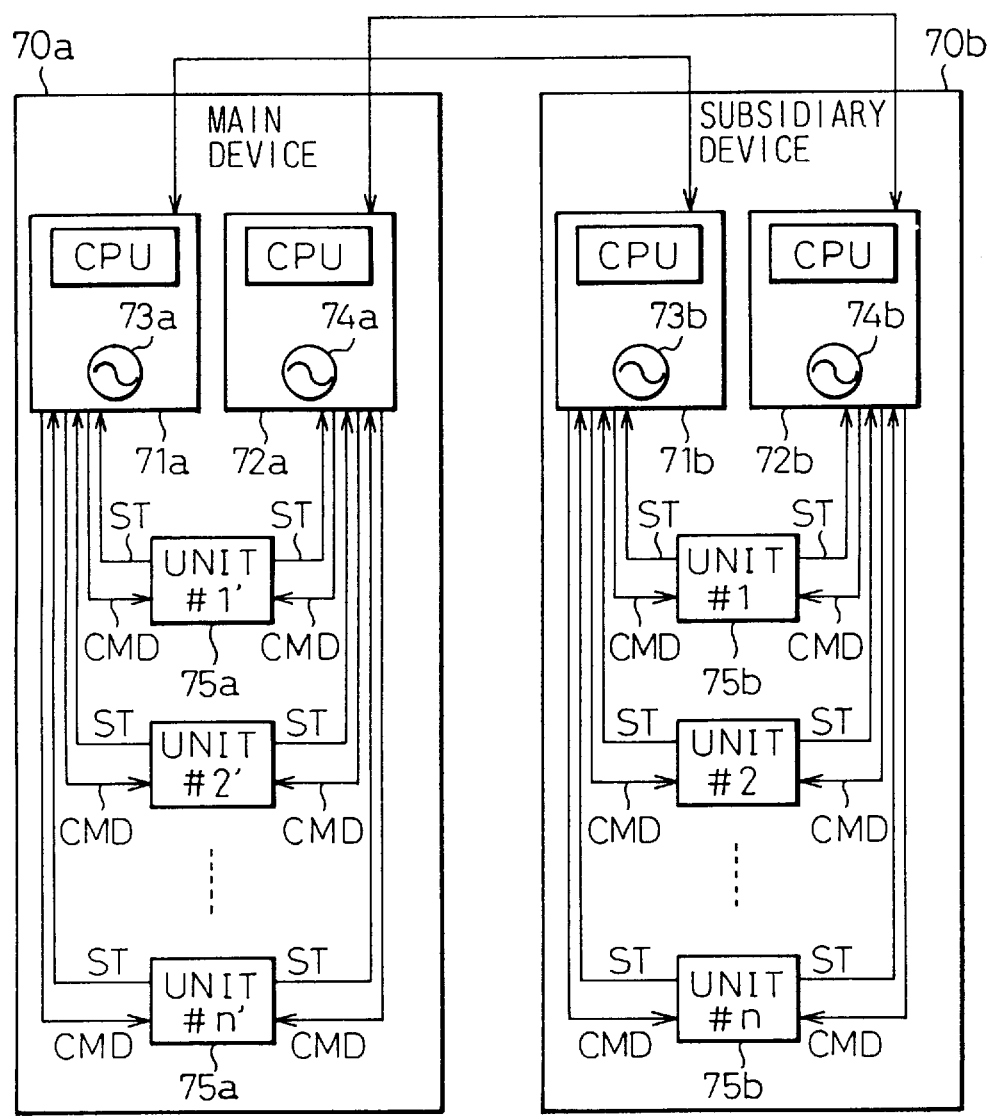
FIG. 2 is an explanatory view of the first example of a multi-device structure according to the prior art.
Figure 3:
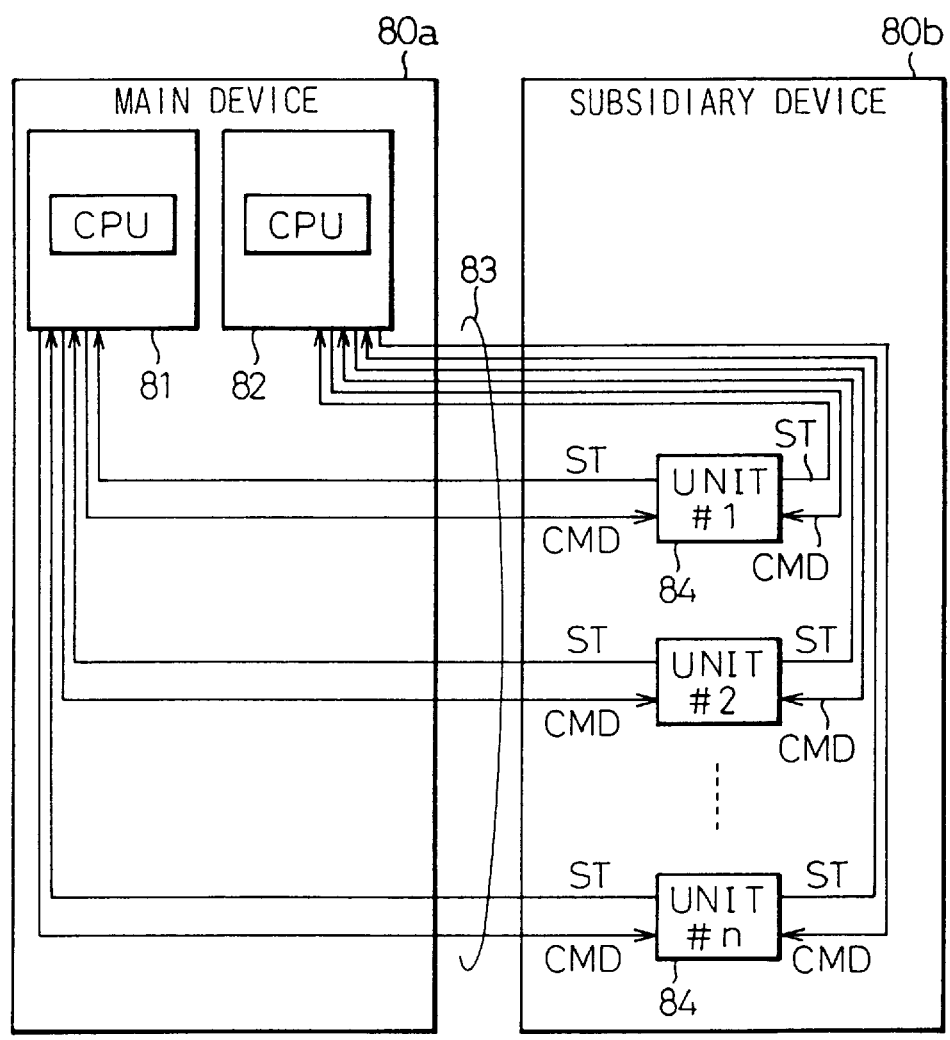
FIG. 3 is an explanatory view of the second example of a multi-device structure according to the prior art.
Figure 4:
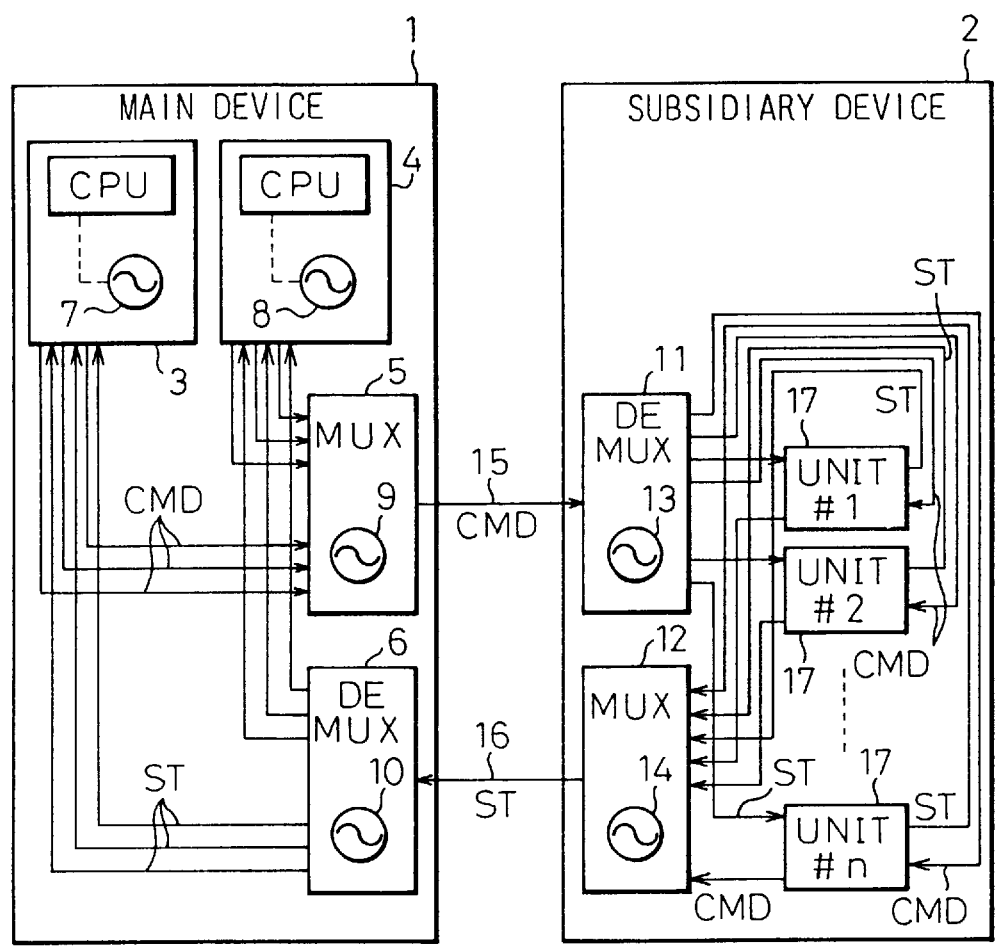
FIG. 4 is an explanatory view of the first preferred embodiment of the present invention.

FIG. 4 is an explanatory view of the first preferred embodiment (hereinafter called the "first embodiment") of the present invention. Reference numeral 1 denotes a main device, reference numeral 2 denotes a subsidiary device, reference numeral 3 denotes a control system processor (that is, a CPU), reference numeral 4 denotes a monitor system processor (that is, a CPU), reference numeral 5 denotes a multiplexer section (generally abbreviated to "MUX") on the main device side, reference numeral 6 denotes a demultiplexer section (generally abbreviated to "DEMUX") on the main device side, reference numerals 7, 8 and 9 denote clock generators, reference numerals 10 and 13 denote phase sync oscillators, reference numeral 11 denotes a demultiplexer section (DEMUX) on the subsidiary device side, reference numeral 12 denotes a multiplexer section (MUX) on the subsidiary device side, reference numerals 15 and 16 denote cables, and reference numeral 17 denotes a plurality of units (UNIT #1 to UNIT #n). The drawing illustrates the case in which a command signal CMD and a status signal ST are transferred between the main device 1 and the subsidiary device 2.

Each of the control system processor 3 and the monitor system processor 4 is equipped with the clock generator 7, 8 comprising a quartz oscillator, etc., and is constituted into a package (or an assembly), and they are packaged (or assembled) in the main device 1, respectively. Each of the clock generators 9 and 14 of the multiplexer section 5 on the main device side and the multiplexer section 12 on the subsidiary device side also comprises a quartz oscillator, etc. Some units, not shown, can be packaged in the main device 1. Each unit 17 (UNIT #1 to UNIT #n) having various functions is packaged in the subsidiary device 2. The multiplexer section 5 on the main device side and the demultiplexer section 11 on the subsidiary side are connected by one cable 15 and the multiplexer section 12 on the subsidiary device side and the demultiplexer section 6 on the main device side are connected by one cable 16.

The control system processor 3 and the monitor system processor 4 execute control and monitor processes in accordance with the clock signals from the respective clock generators 7 and 8, and they normally operate in an asynchronous relationship with each other. The multiplexer section 5 on the main device side is connected to the output ports of the control system processor 3 and the monitor system processor 4, and the demultiplexer on the main device side is connected to the input ports of the control system processor 3 and the monitor system processor 4. The multiplexer section 5 on the main device side executes multiplexing process of the command signals CMD from the control system processor 3 and the monitor system processor 4 in accordance with the clock signal from the clock generator 9, and transfers the multiplex signal to the subsidiary device 2 through the cable 15.

In this case, the phases (or frequencies) of the clock signals from the clock generators 7 and 8 of the control system processor 3 and the monitor system processor 4 are not synchronized with the phase (or frequency) of the clock signal from the clock generator 9 of the multiplexer section 5 on the main device side, and they are slightly different from each other. To correct this difference and to multiplex the signals, bit-stuffing and multiplexing is conducted by inserting and removing a stuff bit (i.e., a stuff pulse), and the multiplex signal obtained by addition of a frame sync pulse, etc., is transferred to the subsidiary device 2 through the cable 15.

The demultiplexer section 11 on the subsidiary device side is equipped with the phase sync oscillator 13 for generating a clock signal whose phase is in synchronism with the multiplex signal. This oscillator deletes the stuff bit by establishing frame synchronization of the multiplex signal, demultiplexes (i.e., separates) the respective command signals CMD and distributes them to the respective units (UNIT #1 to UNIT #n) 17.

The status signal ST from each unit 17 of the subsidiary device 2 is multiplexed by the multiplexer section 12 on the subsidiary device side on the basis of the clock signal from the clock generator 14, and is transferred to the main device 1 through the cable 16. In this case, when each unit 17 operates in accordance with the clock signal from the clock generator 14 of the multiplexer section 12 on the subsidiary device side, multiplexing process can be carried out by using a time slot so allotted as to correspond to each unit. The demultiplexer section 6 on the main device side is equipped with the phase sync oscillator 10 for generating the clock signal whose phase is in synchronism with the multiplex signal, demultiplexes the multiplex signal in such a manner as to correspond to each unit, distributes the multiplex signal to the control system processor 3 and the monitor system processor 4, and inputs the status signal ST to the input port corresponding to each unit.

In the construction described above for executing control and monitor by the control system processor 3 and the monitor system processor 4, respectively, by packaging the control system processor 3 and the monitor system processor 4 in the main device and packaging only a plurality of units 17 in the subsidiary device 2, transferring the command signal CMD and the status signal ST can be conducted between the main device 1 and the subsidiary device 2 by the multiplex signal through one cable 15 for the command signal CMD between the main device 1 and the subsidiary device 2 and through one cable 16 for the status signal ST. When other kinds of signals are transferred, the multiplexer section and the demultiplexer section corresponding to the respective signal are provided to the main device 1 and to the subsidiary device 2, respectively, and they are connected by the cables.

The principle of a bit-stuffing and multiplexing system used for the first embodiment will be hereby explained.

FIGS. 5A and 5B are timing charts, each useful for explaining the flow of the signals by the bit-stuffing and multiplexing system used for the first embodiment. More concretely, FIG. 5A shows the flow of the main frame F1a of the command signal CMD handled inside the multiplexer section 5 on the main device side, and FIG. 5B shows the flow of the subframe F1b of the multiplexed command signal CMD handled and demultiplexed by the demultiplexer section 11 on the subsidiary device side (multiplexed command signal CMD is shown in each of FIGS. 5A and 5B).

FIGS. 5A and 5B assume the case in which the signal to be multiplexed (for example, the command signal CMD) is generated so as to deliver them to three units (UNIT #1, UNIT #2 and UNIT #3) inside the subsidiary device.

The drawings illustrates the case in which the command signal CMD is multiplexed and transferred from the main device to the subsidiary device but does not represent the case in which the status signal ST is multiplexed and transferred from the subsidiary device to the main device. Needless to say, however, such a status signal ST can be treated by exactly the same procedure as for the command signal CMD.

Figure 6:
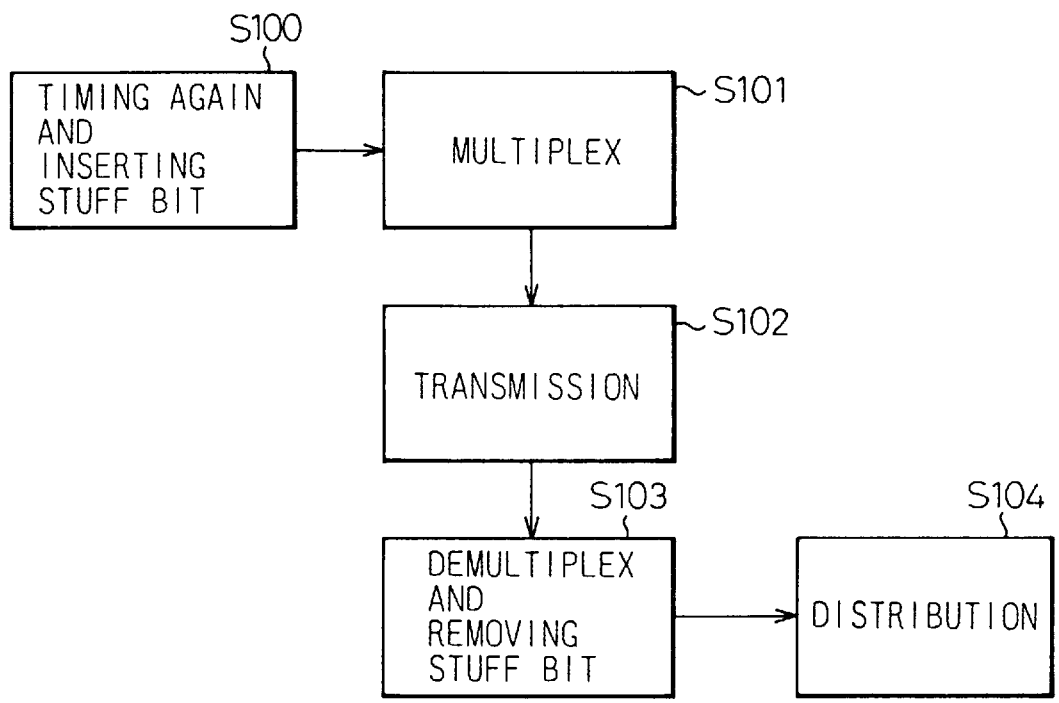
FIG. 6 is a flowchart useful for explaining the procedures of signal processing in the first preferred embodiment of the present invention.

Further, the flow chart of the processing procedure of the command signal CMD is shown in FIG. 6 so that the stuff multiplexing function in the first embodiment of the present invention can be easily understood.

As is obvious from FIGS. 5A, 5B and 6, the procedure for processing the command signal in the first embodiment of the present invention includes the following steps ① to ⑤.

① When three kinds of command signals CMD generated by the monitor system processor and the control system processor are multiplexed, the oscillation frequencies of the three clock generators (that is, oscillators) 7, 8 and 9 are different from each other. Therefore, three kinds of command signals CMD having mutually different cycles T'so as to correspond to these oscillation frequencies are synchronized with the cycle T of the clock generator having the highest frequency. Here, the cycle of the command signal for the unit #3 corresponds to this cycle T. A stuff bit is inserted into each of time slots which are short of the command signal CMD (the time slots of the command signal CMD for the units #1 and #2 in this case) in order to compensate for this deficiency. The signal processing portion described above corresponds to Step S100 in FIG. 6 which sets again the timing of the signal.

② Next, bit-stuffing and multiplexing is executed by narrowing the pulse widths of the three kinds of command signals CMD obtained by executing the Step S100 described above so as to form narrow pulses (i.e., narrowing pulses) each having a cycle T/3. This signal multiplying processing portion corresponds to Step S101 for signal multiplexing in FIG. 6.

③ Further, the multiplex signal obtained by executing the Step S101 described above is transferred to the subsidiary device. Such a signal transmission processing portion corresponds to Step S102 for transferring the signal in FIG. 6.

④ Further, the signal inputted to the subsidiary device is demultiplexed by executing the Step 102 by the demultiplexer section 11 on the subsidiary side, and the stuff bit is removed. Such a signal demultiplex processing portion corresponds to Step S103 for demultiplexing the signal and removing the stuff bit in FIG. 6.

⑤ Further, timing of the signal obtained by executing the Step S103 is again timed (i.e., adjusted) to widen the width of the signal pulse (T/3 to T'), and the original command signal CMD is restored.

The CMD signals so restored are distributed to the desired units (UNIT #1, UNIT #2 and UNIT #3). The distribution processing portion of the CMD signals corresponds to the Step S104 for distributing the CMD signals in FIG. 6.

Figure 7:
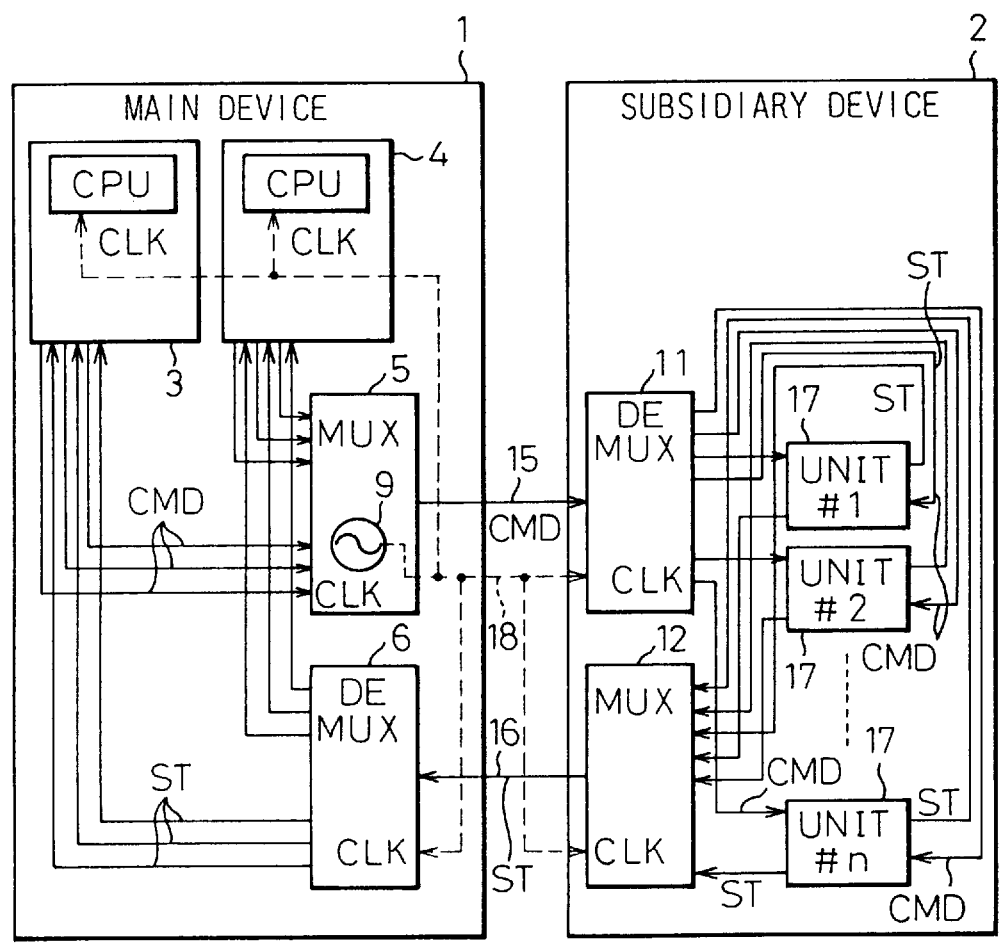
FIG. 7 is an explanatory view of the second preferred embodiment of the present invention.

FIG. 7 is an explanatory view of the second preferred embodiment (hereinafter abbreviated to the "second embodiment") according to the present invention, and like reference numerals are used to identify like constituent members as in FIG. 4. Reference numeral 18 denotes a clock signal line. This embodiment represents the case in which, when the subsidiary unit 2 having a plurality of units 17 packaged therein is connected to the main device 1 having the control system processor 3 and the monitor system processor 4 packaged therein, the clock signal CLK from the clock generator 9 of the multiplexer section 5 on the main device side is supplied to the control system processor 3, the monitor system processor 4, the demultiplexer section 6 on the main device side, and the demultiplexer section 11 as well as multiplex section 12 on the subsidiary device side, through a line represented by dotted lines.

Because the phase of the command signals CMD from the control system processor 3 and the monitor system processor 4 is in synchronism with the phase of the clock signal from the clock generator 9 in this case, the multiplexer section 5 on the main device side can multiplex the command signal CMD merely by using the time slot corresponding to each unit 17 of the subsidiary device 2. The demultiplexer section 11 on the subsidiary side can execute demultiplexing while establishing frame synchronization on the basis of the clock signal CLK from the main device and distributes the command signal CMD to each unit.

The status signal ST from each unit 17 of the subsidiary device 2 is multiplexed by the multiplexer section 12 on the subsidiary device side and is transferred to the main device 1 through the cable 16, and the demultiplexer section 6 on the main device side executes demultiplexing while establishing frame synchronization, and separates and transfers the status signal ST corresponding to each unit 17 to the input port corresponding to each unit of the control system processor 3 and the monitor system processor 4.

According to this embodiment, various signals between the main device 1 and the subsidiary device 2 can be transferred by multiplexing through one of each cable 15, 16 in the same way as in the first embodiment shown in FIG. 4. Further, since this embodiment employs the construction wherein the control system processor 3 and the monitor system processor 4 operate in synchronism with the clock signal CLK for multiplexing process, the multiplexing process can be carried out in the multiplexer section 5 on the main device side.

Figure 8:
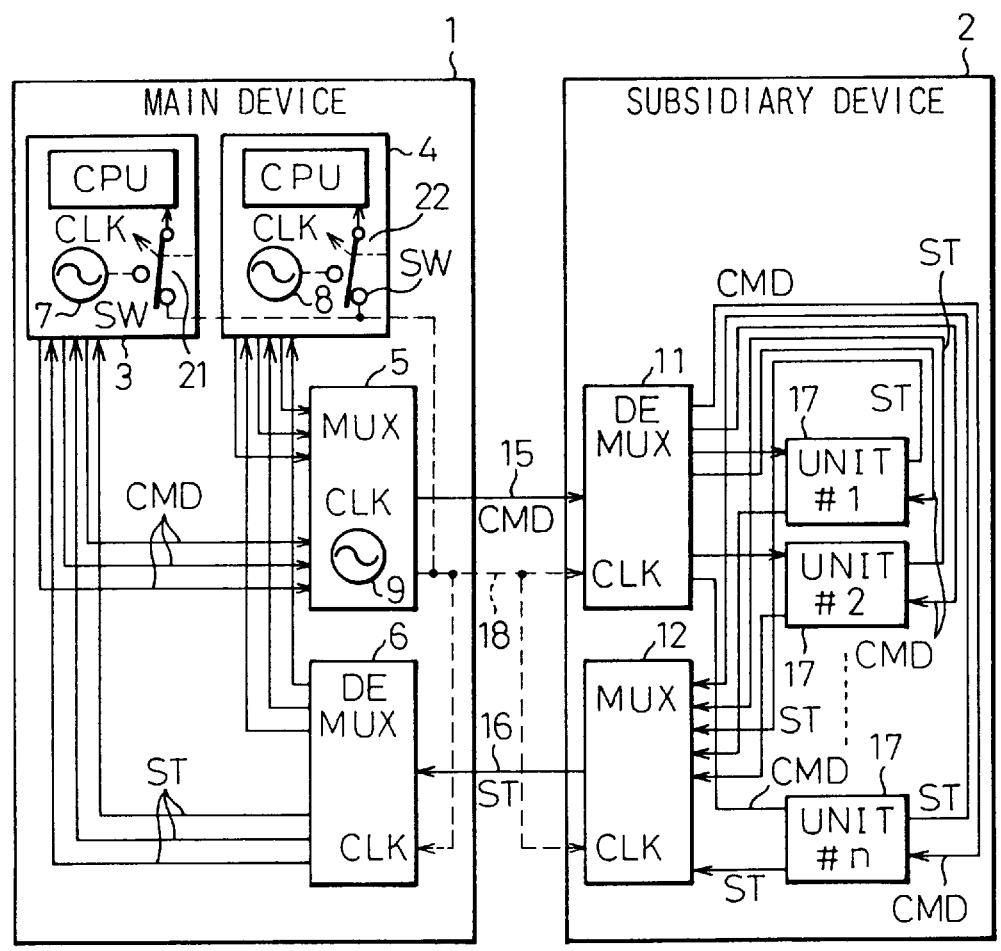
FIG. 8 is an explanatory view of the third preferred embodiment of the present invention.

FIG. 8 shows the third preferred embodiment (hereinafter abbreviated to the "third embodiment") of the present invention, wherein like reference numerals are used to identify like constituent members as in FIGS. 4 and 7. Reference numerals 21 and 22 denote switch sections (SW). When a transfer apparatus, etc., is constituted by only the main device 1, the multiplexer section 5 on the main device side and the demultiplexer section 6 on the main device side for connecting the subsidiary device 2 are not packaged. Therefore, the switch sections 21 and 22 are switched from the position indicated by solid lines to the direction indicated by dotted line arrow, the control system processor 3 operates in accordance with the clock signal from the clock generator 7 and the monitor system processor 4 operates in accordance with the clock signal from the clock generator 8.

In the case in which the function of the transfer apparatus is not sufficient when using the main device 1 alone, the subsidiary device 2 having a plurality of units 17 (UNIT #1 to UNIT #n) packaged therein is connected, and the demultiplexer section 11 on the subsidiary device side and the multiplexer section 12 on the subsidiary device side are further packaged in the subsidiary device 2. The multiplexer section 5 on the main device side equipped with the clock generator 9 and the demultiplexer section 6 on the main device side are packaged in the main device as shown in the drawing, the output ports of the control system processor 3 and the monitor system processor 4 are connected to the multiplexer section 5 on the main device side, and the input ports of the control system processor 3 and the monitor system processor 4 are connected to the demultiplexer section 6 on the main device side. The main device 1 and the subsidiary device 2 are connected by the cables 15 and 16 and the clock signal line 18. The switch sections 21 and 22 are switched to the position indicated by the solid line.

Accordingly, each section operates synchronously with the clock signal CLK from the clock generator 9 of the multiplexer section 5 on the main device side, and the multiplexer section 5 on the main device side and the multiplexer section 12 on the subsidiary device side can multiplex the command signal CMD and the status signal ST by multiplexing by using the time slot corresponding to each unit 17 and can transfer the signals.

Next, the principle of the synchronous multiplexing system of the second and third embodiments described above will be hereby explained.

FIGS. 9A and 9B are timing charts, each useful for explaining the flow of the signals by the synchronous multiplexing system employed in the second and third embodiments shown in FIGS. 7 and 8. More concretely, FIG. 9A shows the flow of the main frame F2a of the command signal CMD handled inside the multiplexer portion 5 on the main device side, and FIG. 9B shows the flow of the subframe F1b of the multiplexed command signal CMD (shown in each of FIGS. 9A and 9B) handled by the demultiplexer section 11 on the subsidiary device side.

The drawings in FIGS. 9A and 9B assume the case in which a signal to be multiplexed (e.g. the command signal CMD) is generated so that the signal can be transferred to the three units (UNIT #1, UNIT #2 and UNIT #3) inside the subsidiary device.

These drawings represent the case in which the command signal CMD is multiplexed and transferred from the main device to the subsidiary device and does not represent the case in which the status signal ST is multiplexed and transferred from the subsidiary device to the main device, but the latter can be of course accomplished by exactly the same procedure.

Figure 10:
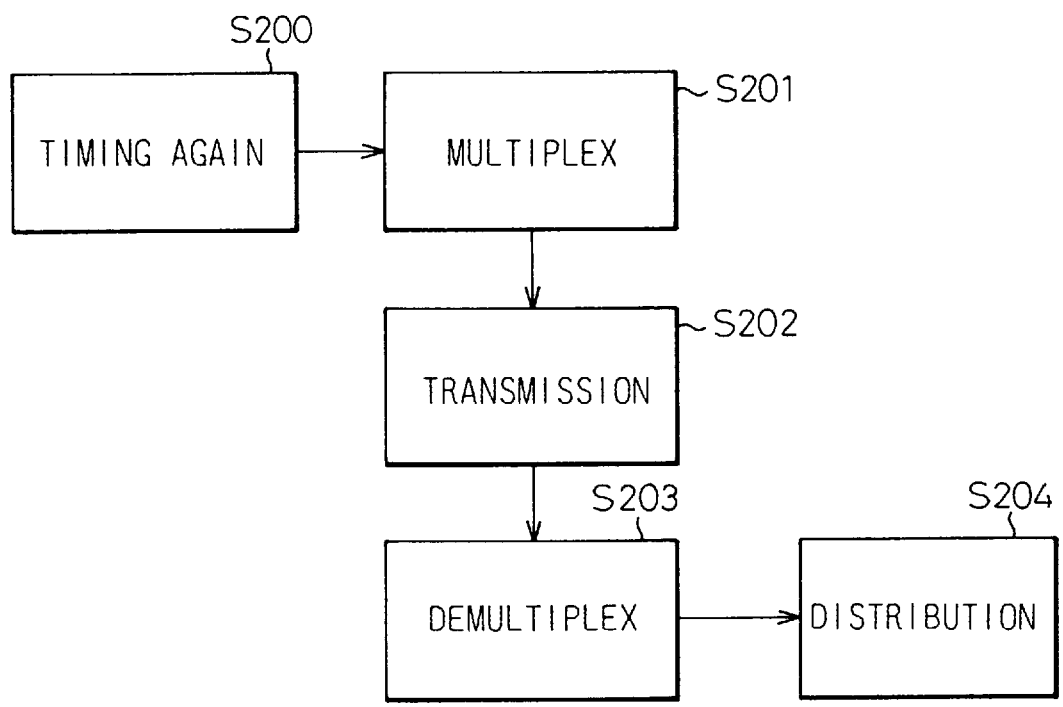
FIG. 10 is a flowchart useful for explaining the procedure of signal processing in the second and third preferred embodiments of the present invention.

FIG. 10 is a flowchart showing the processing procedure of the command signal CMD described above so that the function of synchronous multiplexing in the second and third embodiments of the present invention can be easily understood.

As can be clearly appreciated from FIGS. 9A, 9B and 10, the signal processing procedure of the command signal in the second and third embodiments of the present invention includes the following steps (①  to ⑤).

① In order to multiplex three kinds of command signals CMD generated by the monitor system processor and the control system processor, the phases of these command signals CMD are aligned. In this case, the CPU of the monitor system processor and control system processor and the multiplexer section 5 on the main device side (that is, the sync circuit) operate using the same clock signal (represented by dotted lines in FIGS. 7 and 8) from the clock generator 9. Therefore, the cycle T corresponding to this oscillation frequency is the same for all the signals. For this reason, it is not hereby necessary to insert the stuff bit, and only the phases of the three kinds of command signals need be aligned by setting again the timing. This signal processing portion corresponds to Step S200 for setting again the timing in FIG. 10.

② Next, the pulse widths of the three kinds of command signals CMD obtained by executing the Step S200 are narrowed to obtain narrowing pulses each having a cycle T/3 and synchronous multiplexing is executed. Such a signal multiplexing process corresponds to the Step S201 for multiplexing the signals in FIG. 10.

③ Further, the multiplexed signal obtained by executing the Step 201 is transferred to the subsidiary device. Such a signal transmission processing portion corresponds to the Step S202 for transferring the signal in FIG. 10.

④ The signal inputted to the subsidiary device by executing the Step S202 is demultiplexed by the demultiplexer section 11 on the subsidiary device side. Such a signal demultiplex processing portion corresponds to the Step S203 for demultiplexing the signal in FIG. 10.

⑤ Furthermore, the Step S203 is executed so as to time again the timing of the resulting signal, and the pulse width of the signal is expanded (T/3 to T) to restore the original command signal CMD.

The command signal CMD so restored is distributed to the desired units (UNIT #1, UNIT #2 and UNIT #3). Such a distribution processing portion of the command signal CMD corresponds to the Step S204 for distributing the signal in FIG. 10.

Figure 11:
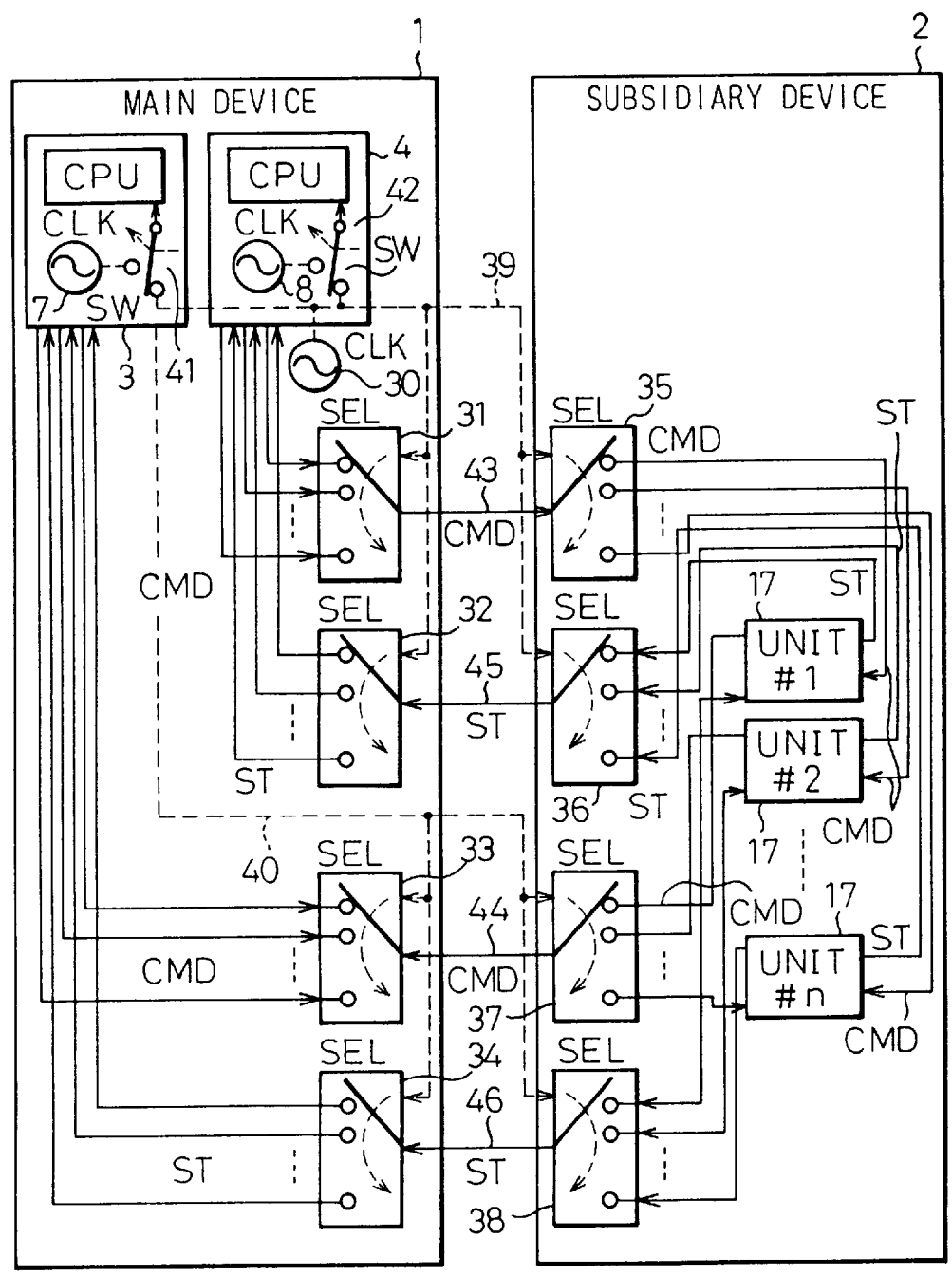
FIG. 11 is an explanatory view of the fourth preferred embodiment of the present invention.

FIG. 11 is an explanatory view of the fourth preferred embodiment of the present invention (hereinafter abbreviated to the "fourth embodiment"). Reference numeral 1 denotes the main device, reference numeral 2 denotes the subsidiary device, reference numeral 3 denotes the control system processor (CPU), reference numeral 4 denotes the monitor system processor (CPU), reference numerals 7, 8 and 30 denote the clock generators, reference numeral 17 denotes the unit (UNIT #1 to UNIT #n), reference numerals 31 to 38 denote the selectors (SEL), reference numerals 39 and 40 denote the control lines, reference numerals 41 and 42 denote the switch sections (SW) and reference numerals 43 to 46 denote the cables.

This embodiment represents the case in which the selector 33 on the main device side corresponding to the command signal CMD from the control system processor 3, the selector 34 on the main device side corresponding to the status signal ST, the selector 31 on the main device side corresponding to the command signal CMD from the monitor system processor 4 and the selector 32 on the main device side corresponding to the status signal ST are provided to the main device 1, and the selectors 35 and 37 on the subsidiary device side corresponding to the selectors 31 and 33 on the main device side, respectively, and the selectors 36 and 38 corresponding to the selectors 32 and 34 corresponding to the main device side, respectively, are provided to the subsidiary device 2.

By carrying out switching operations in the switch sections 41 and 42, the control system processor 3 and the monitor system processor 4 execute various processes in synchronism with the clock signals from the respective clock generators 7 and 8. Further, the above switch sections 41, 42 switch these processors so as to operate in synchronism with the clock signal CLK from the clock generator 30 when the subsidiary device 2 is connected. The switch sections 41 and 42 apply the control signals to the selectors 33 and 34 on the main device side and to the selectors 37 and 38 on the subsidiary side from the control system processor 3 through the control line 40, and also apply the control signals to the selectors 31 and 32 on the main device side and to the selectors 35 and 36 on the subsidiary device side from the monitor system processor 4 through the control line 39.

When the command signal CMD is transmitted from the control system processor 3 to the unit UNIT #1 of the subsidiary device 2, for example, the command signal CMD to the unit UNIT #1 is selected by the selector 33 on the main device side by simultaneously controlling the selector 33 on the main device side as well as the selector 37 on the subsidiary device side, and this command signal CMD is selected by the selector 37 on the subsidiary side and is distributed to the unit UNIT #1. Similarly, the command CMD to the unit 17 of the subsidiary device 2 from the control system processor 3 and the monitor system processor 4 can be transferred by simultaneously controlling the selectors 31 and 33 on the main device side and the selectors 35 and 37 on the subsidiary device side.

When the status signal ST is sent from the unit UNITn to the monitor system processor 4 in response to the command signal CMD from the monitor system processor 4, for example, the selector 36 on the subsidiary side and the selector 32 on the main device side are synchronously controlled by the monitor system processor 4, the status signal ST of the unit UNIT #n is transferred to the main device 1 through the selector 36 on the subsidiary side and through the cable 45, and the selector 32 on the main device side selects this status signal ST and transfers it to the input port of the monitor system processor 4 corresponding to the unit UNIT #n. The monitor system processor 4 can monitor the unit UNIT #n by means of the status signal ST of the input port corresponding to the unit UNIT #n.

According to this embodiment, the control system processor 3 and the monitor system processor 4 can send the command signal to the unit 17 designated arbitrarily, or can receive the status signal ST from the unit designated arbitrarily. Since the selectors are disposed so as to correspond to the command signals CMD and the status signals ST, the transfer operation in accordance with the kind of signals can be carried out without increasing the transfer rate in comparison with the multiplex transfer system even when the number of units increases.

Next, the principle of signal transfer between devices by utilizing the group of selectors according to the fourth embodiment described above will be explained.

Figure 12A:
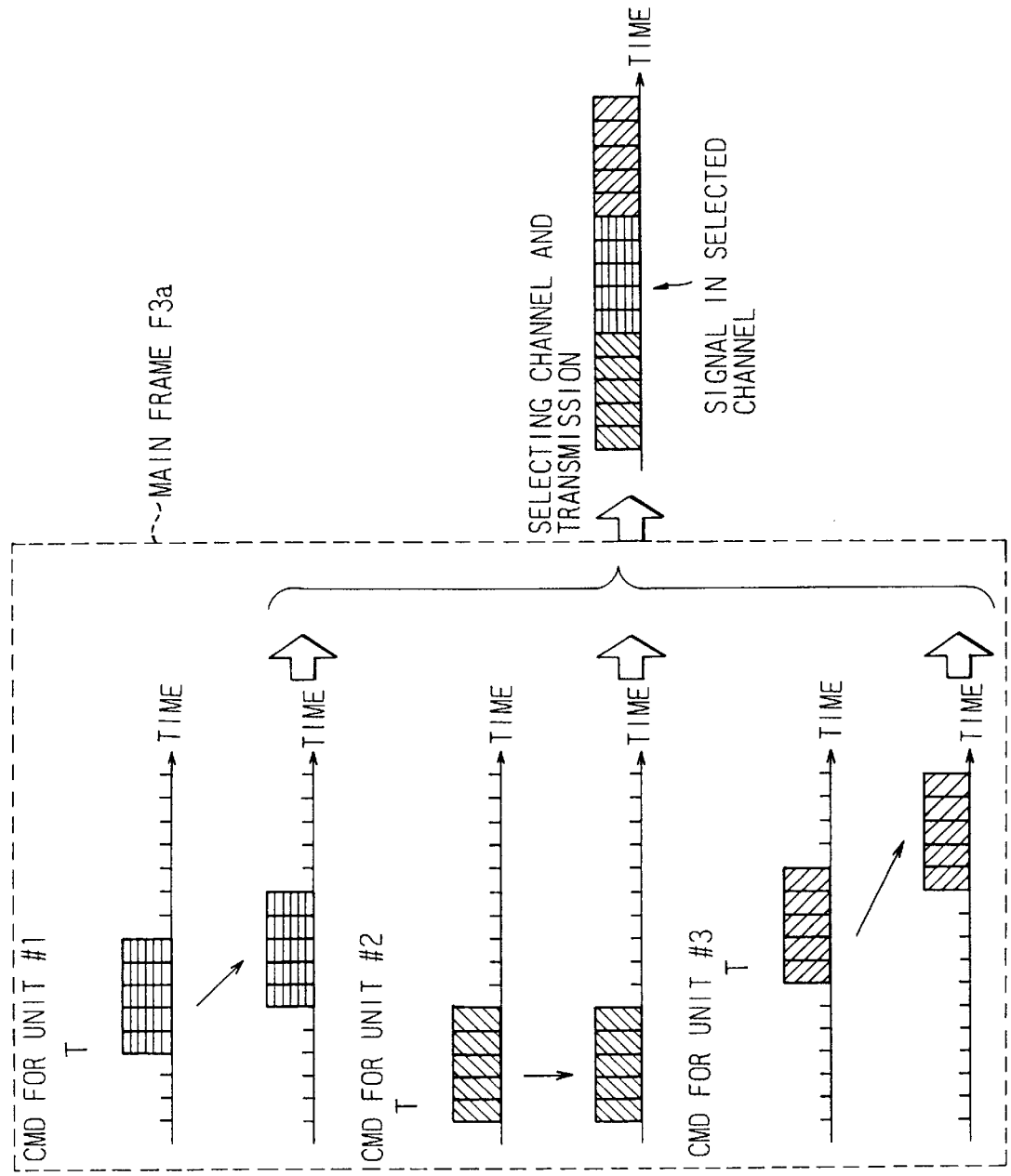

FIGS. 12A and 12B are timing charts, each useful for explaining the flow of signals when the selector sections in the fourth embodiment are utilized. More specifically, FIG. 12A shows the flow of the main frame F3$a$ of the command signal CMD inside the selector on the main device side, and FIG. 12B shows the flow of the subframe F3$b$ of the command signal CMD (shown in each of FIGS. 12A and 12B) inside the selector on the subsidiary device side.

The drawings in FIGS. 12A and 12B assume the case in which the signal (for example, the command signal CMD) to be transferred to the three units (UNIT #1, UNIT #2 and UNIT #3) inside the subsidiary device is generated.

The drawings represent the case in which the command signal CMD is transferred from the main device to the subsidiary device and do not represent the case in which the status signal ST is transferred from the subsidiary device, but the transfer of the status signal ST can be of course carried out by executing exactly the same procedure.

Figure 13:
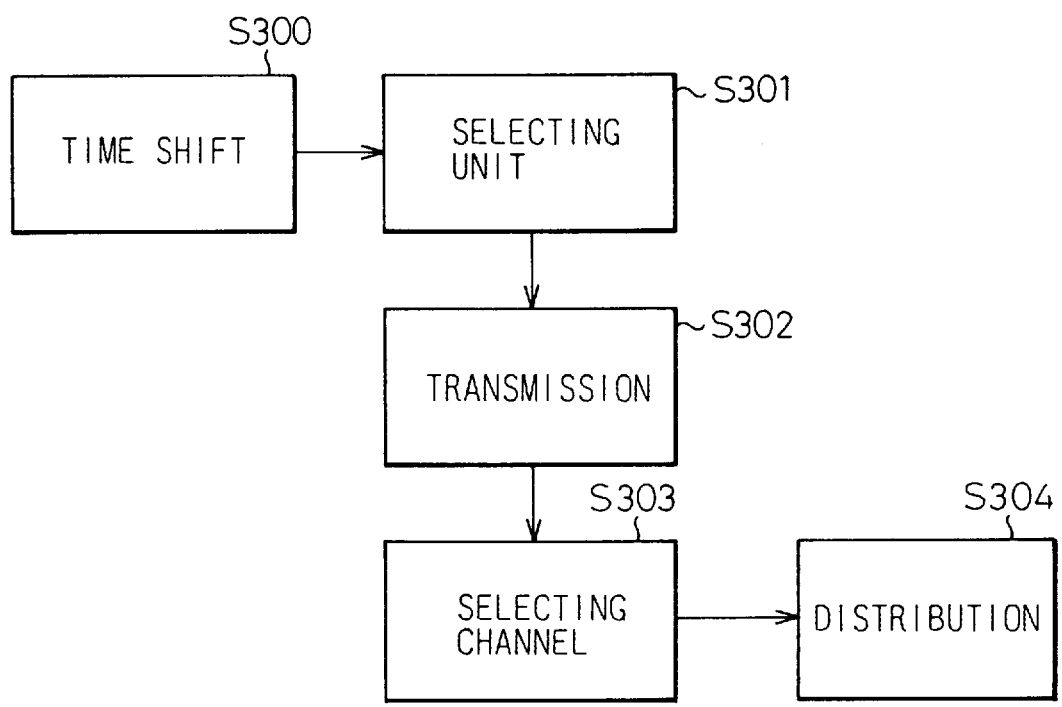
FIG. 13 is a flowchart useful for explaining the procedure of signal processing in the fourth preferred embodiment of the present invention.

FIG. 13 is a flowchart showing the processing procedure of the command signal CMD described above so that the functions of the selectors in the fourth embodiment of the present invention can be easily understood.

As can be clearly understood from FIGS. 12A, 12B and 13, the processing procedure of the command signal in the fourth embodiment comprises the following steps ① to ⑤.

① Since a plurality of kinds of command signals CMD are transferred, they are shifted time-wise by using a buffer, etc., so that the respective command signals CMD do not overlap, time-wise, with one another. The processing portion of the time shift of the signals corresponds to the Step S300 in FIG. 13.

② Next, the channels in which the command signals CMD are generated are selected by operating the selectors 31 and 40 on the main device side for the serial command signals CMD obtained by executing the Step S300. The processing portion of the channel section of the signals corresponds to the Step S301 for selecting the channel in FIG. 13.

③ Further, the command signals CMD obtained by executing the Step S301 are transferred to the subsidiary device. Such a signal transmission processing portion corresponds to the Step S302 for transferring the signals in FIG. 13.

④ The units (UNIT #1, UNIT #2 and UNIT #3) to which the signals are to be distributed are selected by operating the selectors 35 and 40 on the subsidiary device side for the command signals CMD inputted to the subsidiary device by executing the Step S302. The processing portion of the unit selection corresponds to the Step S303 for selecting the distributed units in FIG. 13.

⑤ Three kinds of command signals CMD obtained by executing the Step 303 are distributed to the corresponding units, respectively. The processing portion of the distribution of the command signals corresponds to the Step 304 for distributing the signals in FIG. 13.

Figure 14:
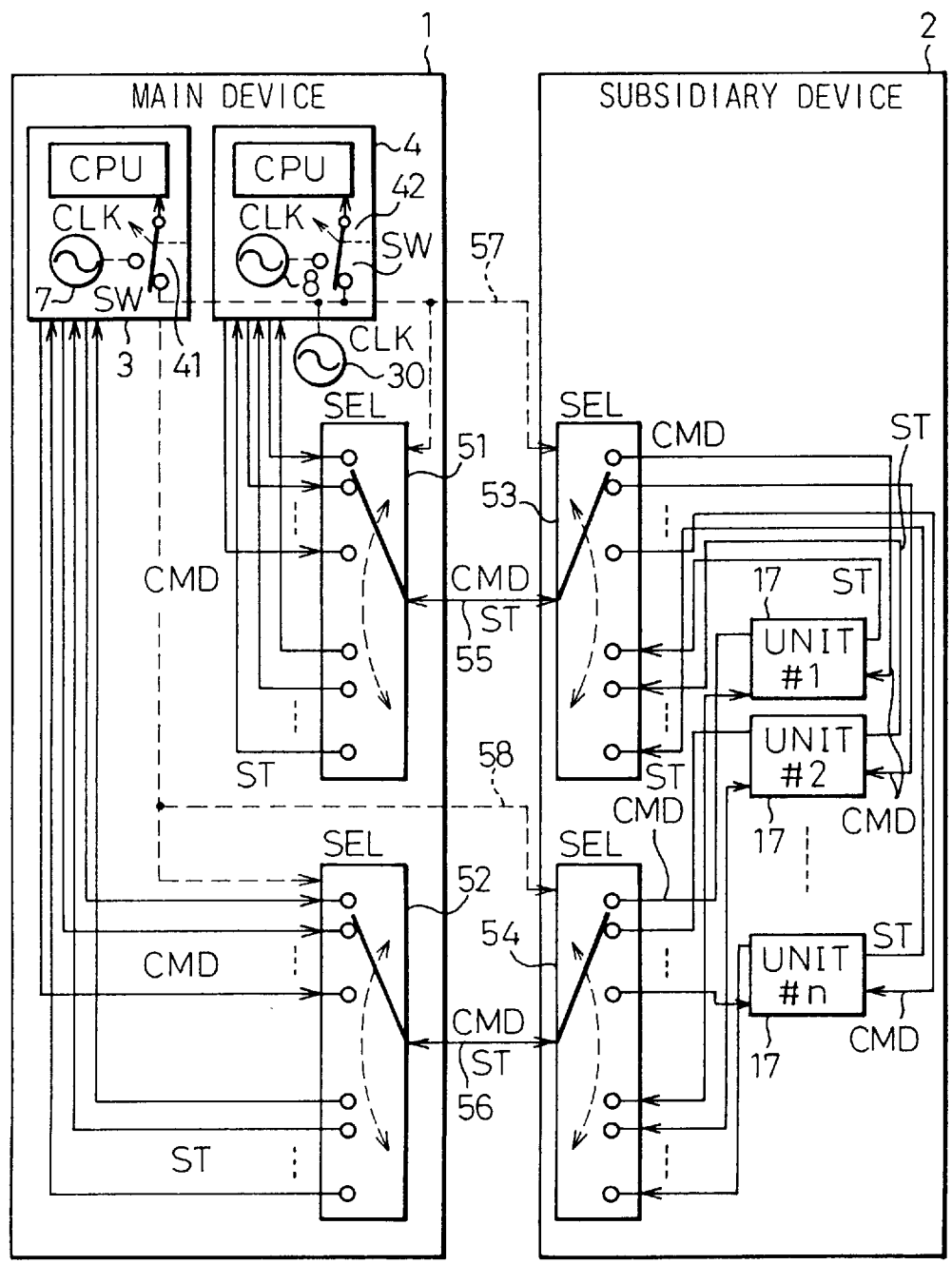
FIG. 14 is an explanatory view of the fifth preferred embodiment of the present invention.

FIG. 14 is an explanatory view of the fifth preferred embodiment (hereinafter abbreviated to the "fifth embodiment") of the present invention. Like reference numerals will be used in this drawing to identify like constituent members as in FIG. 11. Reference numerals 51 and 52 denote the selectors (SEL) on the main device side, reference numerals 53 and 54 denote the selectors (SEL) on the subsidiary device side, reference numerals 55 and 56 denote the cables, and reference numerals 57 and 58 denote the control lines.

In this embodiment, since the transfer of the command signal CMD from the control system processor 3 or the monitor system processor 4 to each unit 17 and the transfer of the status signal ST from the unit 17 corresponding to the former are not simultaneously carried out, the selectors are so disposed as to correspond to the control system processor 3 and the monitor system processor 4. In the same way as in the embodiment described above, the switch sections 41 and 42 supply the clock signals from the clock generators 7 and 8 to the control system processor 3 and the monitor system processor 4 when the operation is executed by only the main device 1, and when the subsidiary device 2 is connected, they are switched so as to supply the clock signal CLK from the clock generator 30.

When the command signal CMD is delivered from the monitor system processor 4 to the unit UNIT #2 of the subsidiary device 2, for example, the selector 51 on the main device side and the selector 53 on the subsidiary device side are synchronously controlled by the monitor system processor 4, the command signal CMD from the output port of the monitor system processor 4 corresponding to the unit UNIT #2 is transferred to the subsidiary device 2 from the selector 51 on the main device side through the cable 55, and the selector 53 on the subsidiary device side selects the command signal CMD and transfers it to the unit UNIT #2. When the status signal ST is transferred from this unit (UNIT #2) to the monitor system processor 4, the monitor system processor 4 synchronously controls the selector 53 on the subsidiary device side and the selector 51 on the main device side, selects the status signal ST from the unit UNIT #2 and transfers it to the main device 1 through the cable 55. The selector 51 on the main device side selects this status signal ST and transfers it to the input port of the monitor system processor 4 corresponding to the unit UNIT #2.

Next, the principle of the signal transfer between the devices by utilizing the group of the selectors according to the fifth embodiment will be explained.

FIGS. 15A and 15B are flowcharts, each useful for explaining the flow of the signals by utilizing the group of selectors of the fifth embodiment shown in FIG. 14. More specifically, FIG. 15A shows the flow of the main frame F4a of the command signal CMD and the command signal CMD common to the status signal ST inside the selector on the main device side, and FIG. 15B shows the flow of the subframe F4b of the command signal CMD and the command signal CMD common to the status signal ST inside the selector on the subsidiary device side (shown in each of FIGS. 15A and 15B).

The drawings in FIGS. 15A and 15B assume the case in which the signals (such as the command signal CMD and the status signal ST) to be transferred to the three units (UNIT #1, UNIT #2 and UNIT #3) inside the subsidiary device are generated.

In these drawings, since the same principle is applicable to the command signal CMD and the status signal ST, the flow of only one of the command signal CMD and the status signal ST of the control system processor or the monitor system processor is typically shown.

Further, the processing procedure of the command signal CMD and the status signal ST is shown in the flowchart of FIG. 16 so that the functions of the common selector section in the fifth embodiment of the present invention can be easily understood.

As can be seen clearly from FIGS. 15A, 15B and 16, the processing procedure of the command signal or the status signal comprises the following steps (① to ⑤).

① Here, since a plurality of kinds of command signals CMD and a plurality of kinds of status signals ST are transferred, these command signals CMD and status signals ST are shifted time-wise so that they do not overlap, time-wise, with one another. Such a time shift processing portion of the signals corresponds to the Step S400 in FIG. 16.

② Next, the selector 51 on the main device side is operated for the serial command signals CMD or status signals obtained by executing the Step S400 so as to select the channels in which the command signals CMD or the status signals ST are generated. Such a channel selection portion of the signals corresponds to the Step S401 for selecting the channel in FIG. 16.

③ Further, the command signals CMD and the status signals ST selected by executing the Step 401 are transferred between the main device and the subsidiary device. By the way, the channel for the signals, that is, the transfer line, in this fifth embodiment, is used for bidirectional transfer unlike the fourth embodiment given above.

Such a signal transmission processing portion corresponds to the Step S402 for transferring the signals in FIG. 16.

④ Further, the selector 53 on the subsidiary side is operated for the command signals CMD or the status signals ST transferred by executing the Step S402 so as to select the unit to be distributed or the package (SV PKG or Control PKG) of the monitor system processor or the control system processor. Such a selection portion of the unit or the package corresponds to the Step S403 for selecting the unit to be distributed or the package in FIG. 16.

⑤ The command signals CMD or the status signals ST obtained by executing the Step S403 are distributed to the corresponding unit or the package of the monitor system processor or the control system processor. Such a distribution processing portion of the command signals CMD or the status signals ST corresponds to the Step S404 for distributing the signals in FIG. 16.

The present invention is not particularly limited to each of the foregoing embodiments but various additions and modifications can be made. For example, signal transfer between the main device 1 and the subsidiary device 2 is not limited to the command signal CMD and the status signal ST, but other kinds of signals can also be transferred. Further, a plurality of subsidiary devices 2 can be connected to the main device 1.

According to the several preferred embodiments of the present invention described above, the signals to be transferred between the main device having at least the control system processor and the monitor system processor packaged therein and the subsidiary device having a plurality of units packaged therein are transferred by multiplexing or by the selection by the selectors. Therefore, the number of cables connecting the main device and the subsidiary device can be remarkably reduced, and the functions of the system such as a transfer apparatus can be easily expanded.

Each of the control system processor and the monitor system processor is generally equipped with the clock generator and is packaged in one device. When the switch section is disposed so as to connect the subsidiary device in such a case, multiplex processing can be simplified by supplying the clock signals from the clock generator of the multiplexer section on the main device side and effecting the synchronous operation.

We claim:

1. A system for controlling signal transfer between a plurality of devices, for controlling the transfer of signals between a main device having at least a control system processor and a monitor system processor packaged therein and a subsidiary device having a plurality of units packaged therein, including:
    a multiplexer section on the main device side for multiplexing the signals from said control system processor and said monitor system processor of said main device;
    a demultiplexer section on the subsidiary device side for demultiplexing a multiplex signal from said multiplexer section on the main device side and distributing it to said units of said subsidiary device;
    a multiplexer section on the subsidiary side for multiplexing the signal from said units of said subsidiary device; and
    a demultiplexer section on the main device side for demultiplexing the multiplex signal from said multiplexer section on the subsidiary device side and distributing it to said control system processor and said monitor system processor of said main device, wherein:
        said multiplexer section on the main device side includes a clock generator for multiplexing, and executes bit-stuffing and multiplexing corresponding to the difference between the phase of a clock signal from said clock generator and the phases of clock signals from clock generators of said control system processor and said monitor system processor, and said demultiplexer section on the subsidiary side includes a phase sync oscillator for generating a clock signal in phase synchronism with the multiplex signal from said multiplexer section on the main side, demultiplexes a multiplex signal multiplexed by bit-stuffing and multiplexing from said multiplexer section on the main device side, by bit-stuffing synchronization, and distributes it to said units.

2. A system for controlling signal transfer between a plurality of devices, for controlling the transfer of signals between a main device having at least a control system processor and a monitor system processor packaged therein and a subsidiary device having a plurality of units packaged therein, including:
    a multiplexer section on the main device side for multiplexing the signals from said control system processor and said monitor system processor of said main device;
    a demultiplexer section on the subsidiary side for demultiplexing a multiplex signal from said multiplexer section on the main device side and distributing it to said units of said subsidiary device;
    a multiplexer section on the subsidiary side for multiplexing the signal from said units of said subsidiary device; and
    a demultiplexer section on the main device side for demultiplexing the multiplex signal from said multiplexer section on the subsidiary device side and distributing it to said control system processor and said monitor system processor of said main device, wherein:
        said multiplexer section on the main device side includes a clock generator for multiplexing, the clock signal from said clock generator is supplied to said control system processor, to said monitor system processor and to said demultiplexer section on the main device side, and is also supplied to said multiplexer section on the subsidiary side and to said demultiplexer section on the subsidiary device side, the signals from said control system processor and said monitor system processor to said units of said subsidiary device are multiplexed on the basis of said clock signal and are transferred to said subsidiary device, and said demultiplexer section on the subsidiary side demultiplexes said multiplex signal from said multiplexer section on the main device side and distributes it to said units.

3. A system for controlling signal transfer between a plurality of devices, for controlling the transfer of signals between a main device having at least a control system processor and a monitor system processor packaged therein, each of said processors having a clock generator, and a subsidiary device having a plurality of units packaged therein, including:
    a multiplexer section on the main device side equipped with a clock generator, for multiplexing the signals from said control system processor and said monitor system processor of said main device on the basis of a clock signal from said clock generator;
    a demultiplexer section on the subsidiary device side for demultiplexing the multiplex signal from said multiplexer section on the main device side and distributing it to said units of said subsidiary device;
    a multiplexer section on the subsidiary device side for multiplexing the signals from said units of said subsidiary device; and
    a demultiplexer section on the main device side for demultiplexing the multiplex signal from said multiplexer section on the subsidiary side and distributing it to said control system processor and said monitor system processor of said main device, wherein:
        each of said control system processor and said monitor system processor of said main device includes a switch section in which switching operations are carried out, so that said control system processor and said monitor system processor of said main device are operated in synchronism with the clock signal from said clock generator of said multiplexer section on the main device side when said subsidiary device is connected, and are operated in synchronism with the clock signal from said clock generator of each of said control system processor and said monitor system processor, and wherein:

said multiplexer section on the main device side supplies the clock signal from said clock generator of said multiplexer section on the main device side to said control system processor and to said monitor system processor through said switch section and also supplies it to said multiplexer section on the subsidiary device side and to said demultiplexer section on the main and subsidiary device side when said subsidiary device is connected, multiplexes the signal from said control system processor and said monitor system processor to said units on the basis of said clock signal and transfers the multiplex signal to said subsidiary device, and said demultiplexer section on the subsidiary device side demultiplexes the multiplex signal from said multiplexer section on the main device side and distributes it to said units.

4. A system for controlling signal transfer between a plurality of devices, for controlling the transfer of signals between a main device having at least a control system processor and a monitor system processor packaged therein and a subsidiary device having a plurality of units packaged therein, including:

a selector on the main device side for sending signals from said control system processor and said monitor system processor of said main device; and a selector on the subsidiary device side for distributing the signal from said selector on the main device side to said units, wherein:

said selector on the main device side and said selector on the subsidiary device side are controlled in such a manner as to select said unit of said subsidiary device for transferring the signal from said main device or said unit of said subsidiary device for transferring the signal to said main device, wherein each of said control system processor and said monitor system processor is equipped with a clock generator, said selector on the main device side is equipped with a clock generator, and each of said control system processor and said monitor system processor of said main device further includes a switch section in which switching operations are carried out, so that said control system processor and said monitor system processor are operated in synchronism with the clock signal from said clock generator of said selector on the main device side when said subsidiary device is connected, and are operated in synchronism with the clock signal of said clock generator of each of said control system processor and said monitor system processor when said subsidiary device is cut off.

5. A system for controlling signal transfer between a plurality of devices, for controlling the transfer of signals between a main device having at least a control system processor and a monitor system processor packaged therein and a subsidiary device having a plurality of units packaged therein, including:

a selector on the main device side for sending signals from said control system processor and said monitor system processor of said main device; and a selector on the subsidiary device side for distributing the signal from said selector on the main device side to said units, wherein:

said selector on the main device side and said selector on the subsidiary device side are controlled in such a manner as to select said unit of said subsidiary device for transferring the signal from said main device or said unit of said subsidiary device for transferring the signal to said main device, wherein said selector on the main device side and said selector on the subsidiary device side are disposed in such a manner as to correspond to the kinds of signals between said control system processor and said units and between said monitor system processor and said units of said subsidiary device, and wherein each of said control system processor and said monitor system processor is equipped with a clock generator, said selector on the main device side is equipped with a clock generator, and each of said control system processor and said monitor system processor of said main device further includes a switch section in which switching operations are carried out, so that said control system processor and said monitor system processor are operated in synchronism with the clock signal from said clock generator of said selector on the main device side when said subsidiary device is connected, and are operated in synchronism with the clock signal of said clock generator of each of said control system processor and said monitor system processor when said subsidiary device is cut off.

6. A system for controlling signal transfer between a plurality of devices, for controlling the transfer of signals between a main device having at least a control system processor and a monitor system processor packaged therein and a subsidiary device having a plurality of units packaged therein, including:

a selector on the main device side for sending signals from said control system processor and said monitor system processor of said main device; and a selector on the subsidiary device side for distributing the signal from said selector on the main device side to said units, wherein:

said selector on the main device side and said selector on the subsidiary device side are controlled in such a manner as to select said unit of said subsidiary device for transferring the signal from said main device or said unit of said subsidiary device for transferring the signal to said main device, wherein said selector on the main device side and said selector on the subsidiary device side are disposed to correspond to said control system processor and said monitor system processor, and wherein each of said control system processor and said monitor system processor is equipped with a clock generator, said selector on the main device side is equipped with a clock generator, and each of said control system processor and said monitor system processor of said main device further includes a switch section in which switching operations are carried out, so that said control system processor and said monitor system processor are operated in synchronism with the clock signal from said clock generator of said selector on the main device side when said subsidiary device is connected, and are operated in synchronism with the clock signal of said clock generator of each of said control system processor and said monitor system processor when said subsidiary device is cut off.

* * * * *